(12) United States Patent
Sheasby et al.

(10) Patent No.: US 11,314,745 B2
(45) Date of Patent: *Apr. 26, 2022

(54) PERIODIC DATABASE SEARCH MANAGER FOR MULTIPLE DATA SOURCES

(71) Applicant: Palantir Technologies Inc., Palo Alto, CA (US)

(72) Inventors: Glenn Sheasby, London (GB); John Boreiko, London (GB); Aakash Goenka, London (GB); Michael Glazer, San Jose, CA (US); Spencer Tank, New York, NY (US); Ezra Spiro, New York, NY (US); Juan Ricafort, New York, NY (US)

(73) Assignee: Palantir Technologies Inc., Denver, CO (US)

( * ) Notice: Subject to any disclaimer, the term of this patent is extended or adjusted under 35 U.S.C. 154(b) by 109 days.

This patent is subject to a terminal disclaimer.

(21) Appl. No.: 16/742,683

(22) Filed: Jan. 14, 2020

(65) Prior Publication Data
US 2020/0327132 A1 Oct. 15, 2020

Related U.S. Application Data

(63) Continuation of application No. 15/406,195, filed on Jan. 13, 2017, now Pat. No. 10,572,487, which is a (Continued)

(51) Int. Cl.
G06F 16/2455 (2019.01)
G06F 16/23 (2019.01)
(Continued)

(52) U.S. Cl.
CPC .... *G06F 16/24566* (2019.01); *G06F 16/2358* (2019.01); *G06F 16/24539* (2019.01); *G06F 16/9535* (2019.01)

(58) Field of Classification Search
CPC ......... G06F 16/24566; G06F 16/24539; G06F 16/2358; G06F 16/9535
(Continued)

(56) References Cited

U.S. PATENT DOCUMENTS 5,745,693 A * 4/1998 Knight .................... H04L 41/06 709/224
9,547,693 B1 1/2017 Sheasby et al.
(Continued)

OTHER PUBLICATIONS

Lim, Hyo-Sang, et al., "Continuous Query Processing in Data Streams Using Duality of Data and Queries", SIGMOD 2006, Chicago, IL, Jun. 27-29, 2006, pp. 313-324.*
(Continued)

*Primary Examiner* — Robert Stevens
(74) *Attorney, Agent, or Firm* — Knobbe, Martens, Olson & Bear, LLP

(57) ABSTRACT

Systems and techniques for searching multiple data sources are described herein. Users may specify searches of multiple data sources to occur on a periodic basis. The searches may be configured to search time or date ranges that have not previously been searched. A user may select the data sources of interest and specify search terms, review and edit previously created searches, and review results of searches. The system automatically performs the specified searches, and notifies the user and/or a team of the user each time new results are found. The system may efficiently search the data sources by storing previous search results and comparing the previous results to current search results to identify new search results.

20 Claims, 19 Drawing Sheets

Related U.S. Application Data continuation of application No. 15/152,017, filed on May 11, 2016, now Pat. No. 9,547,693.

(60) Provisional application No. 62/249,088, filed on Oct. 30, 2015, provisional application No. 62/330,465, filed on May 2, 2016.

(51) Int. Cl.
*G06F 16/2453* (2019.01)
*G06F 16/9535* (2019.01)

(58) Field of Classification Search
USPC .......................................................... 707/768
See application file for complete search history.

(56) References Cited

U.S. PATENT DOCUMENTS

| 10,572,487 B1 | 2/2020 | Sheasby et al. |
| 2008/0046401 A1* | 2/2008 | Lee .................. G06F 16/24568 |

OTHER PUBLICATIONS

Chen, Jianjun, et al., "NiagraCQ: A Scalable Continuous Query System for Internet Databases", MOD 200, Dallas, TX, © ACM 2000, pp. 379-390.*

Condie, Tyson, et al., "Online Aggregation and Continuously Query Support in MapReduce", SIGMOD '10, Indianapolis, IN, Jun. 6-11, 2010, pp. 1115-1118.*

* cited by examiner

— 800

From: Recurring Search
To: Daniel.Fuld@acme-bank.com
Sent: 10/20/1514 3:16PM GMT
Subject: Alerts Detected for "Group Test Hits" — 802

Recurring Search has found new activity for "Group Test Hits"

Created by Andrew at October 15, 2015 13:16:16 05:00
— 804A                                              806A
View summary in Alerts Dossier or Alert Inbox
Manage and Edit your recurring searches
803A

— 850

From: Recurring Search
To: Daniel.Fuld@acme-bank.com
Sent: 10/20/1514 3:16PM GMT
Subject: Alerts Detected for "Group Test Hits"

22 new search result(s) have been found.

| Computer Name | Client IP Address | GMT Time | ... |
|---|---|---|---|
| prod.example.net | 111.11.111.111 | 2015-10-21 13:13:56 GMT | |
| application.example.net | 111.10.111.111 | 2015-10-21 13:13:57 GMT | |
| ab003.prod.com | 195.112.111 | 2015-10-21 13:14:46 GMT | |
| ... | | | |

852

Created by Andrew at October 15, 2015 13:16:16 05:00
854A                                              856A
View summary in Alerts Dossier or Alert Inbox
Manage and Edit your recurring searches
858A

— 860

| Identifier | License Plate | Timestamp | Lat | Long | ... |
|---|---|---|---|---|---|
| 1 | 25A23 | 2015-11-21 13:13:56 GMT | 37.40445 | -122.085271 | |
| 10 | LL2468 | 2015-11-21 13:13:57 GMT | 37.44607 | -122.159123 | |
| 55 | 381287 | 2015-11-21 13:14:46 GMT | 37.40445 | -122.085271 | |
| ... | | | | | |

FIG. 8

You have been redirected to the most recent version of this alert. Return to alert 9606

⚠ ❓ "Group Test Hits" Has Been Detected  OPEN   Take Action ▼   Export... ▼

Triggered by RECURRING SEARCH AA TEAM

❓ Detector created by Andrew on October, 15 2015 13:16:16-05:00
❓ Search range covered October, 15 2015 13:16:16-05:00 to October 21, 2015 08:50:46-05:00
❓ Records span from October, 21 2015 07:07:19-05:00 to October 21, 2015 08:14:22-05:00
❓ 1000 total records found for 1 of 1 terms in 1 of 1 data sources
❓ Click here to run the Web search ♟ ASSIGNED TO Unassigned
◉ AUTHORED BY Unwatched

| Recurring Search Details | |
|---|---|
| Title | Group Test Hits |
| Author | Andrew |
| Description | Guard to lose that. Group detectors are running |
| Date Created | Date Last Updated |

SHOW LOGS (500) ▲

You have been redirected to the most recent version of this alert. Return to alert 9606

⚠ ? "Group Test Hits" Has Been Detected  [Take Action ▼] [Export... ▼]
Triggered by RECURRING SEARCH AA TEAM  [OPEN]

HIDE LOGS (500) ▶

ASCENDING    2015/10/210 15:12            2015/10/210 15:14

| PROXY4 | GMT_TIME | COMPUTER_NAME | CLIENT_IP | LOCAL_DATE |
|---|---|---|---|---|
| 2015/10/21 15:13 | 21/10/2015 13:13:56 GMT | cpxyslo | 111.243.93.111 | 2015-10-21 |
| 2015/10/21 15:13 | 21/10/2015 13:13:56 GMT | cpxyslo | 11.201.74.111 | 2015-10-21 |
| 2015/10/21 15:13 | 21/10/2015 13:13:56 GMT | cpxyslo | 111.189.240.11 | 2015-10-21 |
| 2015/10/21 15:13 | 21/10/2015 13:13:56 GMT | cpxyslo | 11.218.224.11 | 2015-10-21 |
| 2015/10/21 15:13 | 21/10/2015 13:13:56 GMT | cpxyslo | 11.201.72.111 | 2015-10-21 |
| 2015/10/21 15:13 | 21/10/2015 13:13:56 GMT | cpxyslo | 111.165.183.111 | 2015-10-21 |
| 2015/10/21 15:13 | 21/10/2015 13:13:56 GMT | cpxyslo | 111.189.240.11 | 2015-10-21 |
| 2015/10/21 15:13 | 21/10/2015 13:13:56 GMT | cpxyslo | 111.243.93.111 | 2015-10-21 |

500 OF 500 LOGS SHOWN

FIG. 10

"Group Test Hits" Has Been Detected
2015/10/21 15:27   AA Team   OPEN                    Assignee   Unassigned
                                                     Watchers   Unwatched

Conclusions
- Recurring search created by Andrew on October 15, 2015 13:16:16-05:00
- Search range covered October 15, 2015 13:16:16-05:00 to October 21, 2015 08:50:46-05:00
- Records span from: October 21, 2015 07:07:19-05:00 to October 21, 2015 08:14:22-05:00
- 1000 total records found for 1 of 1 terms in 1 of 1 data sources Click here to run Web search

SAVED RECURRING SEARCHES

| NAME | DESCRIPTION | STARTS | EXPIRES | STATUS | LINK |
|---|---|---|---|---|---|
| Acme trends | Will send emails when a trending topic mentions Acme. | Feb 9, 2016 2:51 PM | Mar 9, 2016 2:51 PM | Disabled | EDIT |
| Recurring search on DNS | test | Mar 21, 2016 5:31 PM | Jul 16, 2015 2:10 PM | Disabled | EDIT |
| Trending Acme mentions | Searching for mentions of Acme | Feb 9, 2016 12:10 PM | Mar 9, 2016 12:10 PM | Enabled | EDIT |
| Recurring search on DNS | Searching mentions of Acme on social networking service | Feb 29, 2016 10:58 PM | Mar 29, 2016 10:58 PM | Enabled | EDIT |
| Trending Acme | | Feb 9, 2016 12:18 PM | Mar 9, 2016 12:18 PM | Disabled | EDIT |

FIG. 18

PERIODIC DATABASE SEARCH MANAGER FOR MULTIPLE DATA SOURCES

INCORPORATION BY REFERENCE TO ANY PRIORITY APPLICATIONS

This application is a continuation of U.S. patent application Ser. No. 15/406,195 entitled "Periodic Database Search Manager For Multiple Data Sources," filed Jan. 13, 2017, which is a continuation of U.S. patent application Ser. No. 15/152,017 entitled "Periodic Database Search Manager For Multiple Data Sources" filed May 11, 2016, now U.S. Pat. No. 9,547,693, which claims benefit of U.S. Provisional Patent Application Ser. No. 62/249,088 entitled "Periodic Database Search Manager for Multiple Data Sources" filed Oct. 30, 2015 and U.S. Provisional Patent Application Ser. No. 62/330,465 entitled "Periodic Database Search Manager for Multiple Data Sources" filed May 2, 2016. Each of these applications are hereby incorporated by reference herein in their entireties.

Any and all applications for which a foreign or domestic priority claim is identified in the Application Data Sheet as filed with the present application are hereby incorporated by reference under 37 CFR 1.57.

CROSS-REFERENCE TO RELATED APPLICATIONS

This application hereby incorporates by reference in their entireties, and for all purposes, each of the following:

U.S. Pat. No. 8,799,240 entitled "System and Method for Investigating Large Amounts of Data," which issued from U.S. patent application Ser. No. 13/167,680 filed Jun. 23, 2011 ("the '240 patent").

U.S. Pat. No. 9,092,482 entitled "Fair Scheduling for Mixed-Query Loads," which issued from U.S. patent application Ser. No. 13/826,228 filed Mar. 14, 2013 ("the '482 patent").

U.S. patent application Ser. No. 14/859,882 entitled "Systems and Interactive User Interfaces For Dynamic Retrieval, Analysis, and Triage of Data Items" filed Sep. 21, 2015 ("the '882 application").

BACKGROUND

In the area of computer-based platforms, a database may be queried.

SUMMARY

The systems, methods, and devices described herein each have several aspects, no single one of which is solely responsible for its desirable attributes. Without limiting the scope of this disclosure, several non-limiting features will now be discussed briefly.

One embodiment includes a computer-implemented method for scheduling recurrent searches of multiple disparate electronic logs and for distributing results of the recurrent searches, the computer-implemented method comprising: storing a first plurality of search results in a non-transitory computer storage medium; accessing a search object, the search object comprising one or more search terms, first and second data source identifiers, and a frequency, wherein the first data source identifiers corresponds to a first data source and the second data source identifier corresponds to a second data source, and wherein each data source of the first and second data sources comprises an electronic log; determining to query the first and second data sources based at least in part on the frequency; querying the first and second data sources, wherein each electronic log of the first and second data sources comprises electronic log entries, wherein said querying determines a second plurality of search results; comparing the first plurality of search results to the second plurality of search results; in response to said comparison, determining a new search result, wherein the new search result is present in the second plurality of search results and not present in the first plurality of search results; and transmitting a first alert, wherein the first alert corresponds to the new search result.

In some embodiments, the computer-implemented method of the preceding paragraph can include a combination or sub-combination of features. The first alert can include an electronic communication to a recipient. The computer-implemented method can further include: serializing the first plurality of search results to first data, wherein storing the first plurality of search results comprises storing the first data in the non-transitory computer storage medium; accessing the first data from the non-transitory computer storage medium; and deserializing the first data to a first plurality of objects, wherein comparing the first plurality of search results to the second plurality of search results comprises comparing the first plurality of objects to the second plurality of search results. The computer-implemented method can further include: serializing the second plurality of search results to second data; and replacing, in the non-transitory computer storage medium, the first data with the second data. The computer-implemented method can further include: querying the first data source at a first time, wherein said querying of the first data source determines the first plurality of search results, wherein the new search result corresponds to a log entry in the first data source, the log entry comprising a timestamp, the timestamp predating the first time, and wherein the log entry was added to the first data source after the first time. The computer-implemented method can further include: receiving, from a user interface, user input corresponding to data properties of the search object; and generating the first search object from the user input. The first plurality of search results can correspond to a first set of data objects, and the second plurality of search results can correspond to a second set of data objects, and wherein comparing the first plurality of search results to the second plurality of search results comprises using a set comparison operation on the first set of data objects and the second set of data objects. The search object can further include an event condition, and determining to query the first and second data sources is further based at least in part on an event condition. The computer-implemented method can further include: receiving an event, and wherein determining to query the first and second data sources is further based at least in part on the event condition indicating that the event has occurred. The event can correspond to a data sync of at least one of the first data source or the second data source.

Another embodiment includes a non-transitory computer storage medium for storing computer executable instructions that when executed by a computer hardware processor perform operations comprising: accessing a search object, the search object comprising one or more search terms, a data source identifier, and a frequency, wherein the data source identifier corresponds to a first data source; querying the first data source at a first time, wherein said querying at the first time determines a first plurality of search results; determining to query the first data source again based at least in part on the frequency; querying the first data source at a second time, wherein said querying at the second time determines a second plurality of search results; comparing the first plurality of search results to the second plurality of search results; in response to said comparison, determine a new search result, wherein the new search result is present in the second plurality of search results and not present in the first plurality of search results; and transmitting a first alert, wherein the first alert corresponds to the new search result.

In some embodiments, the non-transitory computer storage medium of the preceding paragraph can include a combination or sub-combination of features. The first alert can include an electronic communication to a recipient. The operations can further include: serializing the first plurality of search results to first data; storing the first data in a second non-transitory computer storage medium; accessing the first data from the second non-transitory computer storage medium; and deserializing the first data to a first plurality of objects, wherein comparing the first plurality of search results to the second plurality of search results comprises comparing the first plurality of objects to the second plurality of search results. The operations can further include: serializing the second plurality of search results to second data; and replacing, in the second non-transitory computer storage medium, the first data with the second data. The new search result can correspond to a log entry in the first data source, the log entry can include a timestamp, the timestamp predates the first time, and wherein the log entry was added to the first data source between the first time and the second time. The operations can further include: receiving, from a user interface, user input corresponding to data properties of the search object; and generating the first search object from the user input. The first plurality of search results can correspond to a first set of data objects, and the second plurality of search results can correspond to a second set of data objects, and wherein comparing the first plurality of search results to the second plurality of search results comprises using a set comparison operation on the first set of data objects and the second set of data objects. The search object can further include an event condition, and determining to query the first data source at the first time is further based at least in part on an event condition. The operations can further include: receiving an event, and wherein determining to query the first data source at the first time is further based at least in part on the event condition indicating that the event has occurred. The event can correspond to a data sync of at least the first data source.

Another embodiment includes a system for scheduling recurrent searches of multiple disparate data sources and for distributing results of the recurrent searches, the system comprising: a non-transitory computer storage medium configured to store a first plurality of search results; a search system, the search system configured to search a plurality of data sources, wherein each data source of the plurality of data sources comprises an electronic log; an alert system; and one or more hardware computer processors programmed, via executable code instructions, to: access a search object, the search object comprising one or more search terms, a plurality of data source identifiers, and an execution condition, wherein the plurality of data source identifiers corresponds to first and second data sources of the plurality of data sources; determine to query the first and second data sources based at least in part on the execution condition; query, via the search system, the first and second data sources, wherein each electronic log of the first and second data sources comprises electronic log entries, wherein said querying determines a second plurality of search results; compare the first plurality of search results to the second plurality of search results; in response to said comparison, determine a new search result, wherein the new search result is present in the second plurality of search results and not present in the first plurality of search results; transmit a first alert to the alert system, wherein the first alert corresponds to the new search result.

In some embodiments, the computing system of the preceding paragraph can include a combination or sub-combination of features. The execution condition can include at least one of a frequency or an event condition. The one or more hardware processors can be further programmed to: receive an event, and wherein determining to query the first and second data sources is further based at least in part on the execution condition indicating that the event has occurred. The event can correspond to a data sync of at least one of the first data source or the second data source. The one or more hardware processors can be further programmed to: serialize the first plurality of search results to first data, wherein the non-transitory computer storage medium is configured to store the first plurality of search results as the first data; access the first data from the non-transitory computer storage medium; and deserialize the first data to a first plurality of objects, wherein comparing the first plurality of search results to the second plurality of search results comprises comparing the first plurality of objects to the second plurality of search results. The one or more hardware processors can be further programmed to: serialize the second plurality of search results to second data; and replace, in the non-transitory computer storage medium, the first data with the second data. The one or more hardware processors can be further programmed to: query, via the search system, the first data source at a first time, wherein said querying of the first data source determines the first plurality of search results, wherein the new search result corresponds to a log entry in the first data source, the log entry comprises a timestamp, the timestamp predates the first time, and wherein the log entry was added to the first data source after the first time. The first plurality of search results can correspond to a first set of data objects, and the second plurality of search results can correspond to a second set of data objects, and wherein comparing the first plurality of search results to the second plurality of search results comprises using a set comparison operation on the first set of data objects and the second set of data objects.

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIG. 8 illustrates example electronic communication alerts, according to some embodiments of the present disclosure.

FIGS. 9, 10, and 11A-11B illustrate example user interfaces of the alert system, according to some embodiments of the present disclosure.

FIGS. 15, 16, 17, and 18 illustrate additional example user interfaces of the search management system, according to some embodiments of the present disclosure.

DETAILED DESCRIPTION

Figure 1:
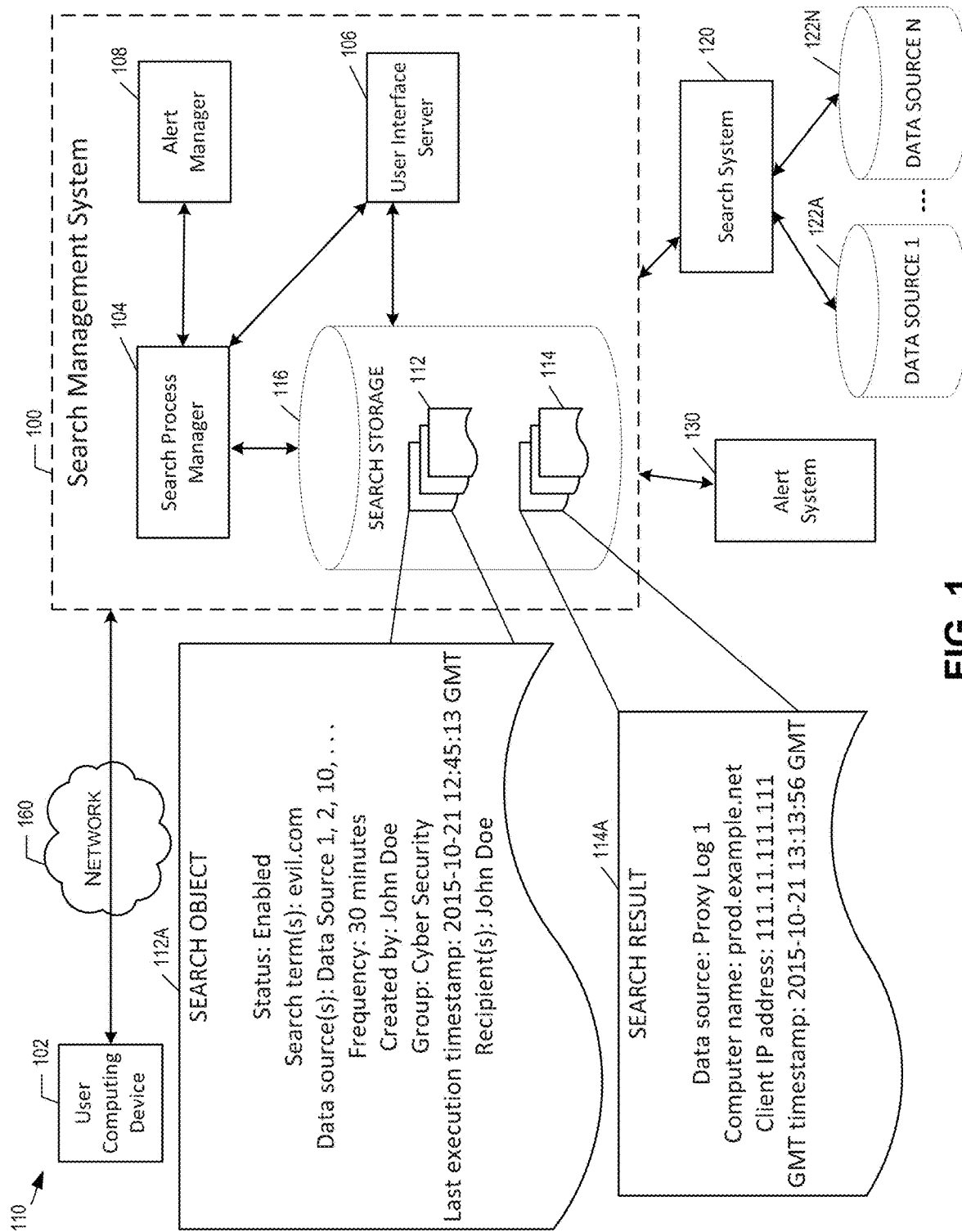
FIG. 1 is a block diagram illustrating an example search management system, according to some embodiments of the present disclosure.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide example definitions.

Ontology: Stored information that provides a data model for storage of data in one or more databases. For example, the stored data may comprise definitions for object types and property types for data in a database, and how objects and properties may be related.

Database: Any data structure (and/or combinations of multiple data structures) for storing and/or organizing data, including, but not limited to, relational databases (e.g., Oracle databases, mySQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores. The terms "database" and "data source" may be used interchangeably in the present disclosure.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Data Object (Object), Data Item (Item), or Data Entity (Entity): A data container for information. A data object may be associated with a number of definable properties (as described herein). As described herein, a search object is an example data object for conducting recurrent searches. A data object may represent a specific thing, or a group of things, in the world. For example, a data object may represent an item such as a person, a place, an organization, an account, a computer, an activity, or other noun. A data item may represent an event that happens at a point in time or for a duration. A data item may represent a document or other unstructured data source such as an e-mail message, a news report, or a written paper or article. Each data item may be associated with a unique identifier that uniquely identifies the data item. The terms "data object," "data item," "data entity," "item," "object," and "entity" may be used interchangeably and/or synonymously in the present disclosure.

Item (or Entity or Object) Type: Type of a data item (for example, Person, Event, or Document). Data item types may be defined by an ontology and may be modified or updated to include additional data item types. An data item definition (for example, in an ontology) may include how the data item is related to other data items, such as being a sub-data item type of another data item type (for example, an agent may be a sub-data item of a person data item type), and the properties the data item type may have.

Properties: Also referred to herein as "attributes" or "metadata" of data items. A property of a data item may include any item of information associated with, and/or relevant to, the data item. At a minimum, each property of a data item has a property type and a value or values. For example, properties associated with a person data item may include a name (for example, John Doe), an address (for example, 123 S. Orange Street), and/or a phone number (for example, 800-0000), among other properties. In another example, properties associated with a computer data item may include a list of users (for example, user 1, user 2, and the like), and/or an IP (internet protocol) address, among other properties.

Property Type: The type of data a property is, such as a string, an integer, or a double. Property types may include complex property types, such as a series data values associated with timed ticks (for example, a time series), and the like.

Property Value: The value associated with a property, which is of the type indicated in the property type associated with the property. A property may have multiple values.

Recurrent (or Recurring) Search: Refers to a search of a data source that is scheduled and/or occurs one or more times. A non-limiting example recurrent search is a periodic search, such as a search occurring and/or being initiated every 15 minutes, 30 minutes, hourly, daily, weekly, any other periodic pattern, and/or some combination thereof. In some embodiments, a recurrent search may be based on some other schedule that is non-periodic. For example, a recurrent search may be triggered by an event and/or may be based on evaluation of data coming into the system. For example, the system may be configured to initiate a search when new data is added to a data source, which may occur on an ad-hoc basis. Accordingly, the event and/or data-driven searches may occur in real-time or substantially in real-time.

Overview

Analysts may be interested in searching enormous data sets on a recurring and/or automatic basis. The data sets may be from multiple disparate data sources that include gigabytes, terabytes, or even petabytes of data. Non-limiting example data sources include electronic logs, such as, proxy logs, virtual private network ("VPN") logs, malware lists, email logs, phone call logs, vehicle logs, geographic logs, or other electronic logs discussed herein. Example searches include partial text string matching for known uniform resource locators ("URLs") or names of malware within the electronic logs. Accordingly, the systems and techniques discussed herein may be used to automatically identify potential threats that may be intrinsically tied to network and/or computer technology, such as proxy logs, network security, malware, phishing, and/or other computer-related areas. Those analysts may also be interested in receiving alerts via electronic communications and/or via an alert system to review search results.

Disclosed herein are systems and methods for enabling a user to specify searches of multiple data sources to automatically occur on a periodic basis. For example, a user may create a search object that specifies the data sources of interest, search terms, and a frequency for the search to occur. The user may configure new and/or edit recurrent searches on an ad-hoc basis through the user interface of the system. Example frequencies for recurrent searches include every fifteen minutes, thirty minutes, hourly, daily, weekly, any other periodic pattern, and/or some combination thereof. In some embodiments, queries are sent to a search system that efficiently searches multiple disparate data sources. For example, the search system may be optimized to efficiently search the data sources based on the last search timestamp to only search data source entries after the last search timestamp. The user may also review and edit previously created searches, and review results of searches. The system automatically performs the specified searches, and notifies the user and/or a team of the user each time new results are found. For example, an email electronic communication alert, such as email, may be sent to one or more users and/or teams. In some embodiments, alerts may be sent to an alert system that enables a user and/or users of one or more permissioned groups to view the search results.

Embodiments of the present disclosure relate to an efficient and/or optimized alerting system. For example, search results may be viewed in more detail in an optimized alert graphical user interface. In an embodiment, data related to search results is transmitted from a search management system to an alert system. In this embodiment, the alert system may use the received data to generate the alert and/or to enhance the received data with additional information that may be useful to an analyst in reviewing the search result. Additionally or alternatively, the alert system may send an electronic communication alert that optionally includes a link to view the alert in the alert system.

Embodiments of the present disclosure relate to a search management system that may automatically search multiple data sources in a memory-efficient and/or resource-efficient manner. For example, the recurrent searches of the search management system may repeatedly search the multiple data sources such that the searching is targeted towards recently added data and/or avoids recurrent searches of previously searched data, which may be from data sources of terabytes or petabytes of data. Accordingly, the systems and methods described herein may provide early notification associated with one or multiple data sources when there has been an update to those respective data sources that correspond to user-specified criteria.

Example Search Management System

FIG. 1 illustrates a search management system 100, according to some embodiments of the present disclosure. In the embodiment of FIG. 1, the database environment 110 includes a network 160, a search management system 100, user computing device 102, a search system 120, and an alert system 130. Various communications between these devices are illustrated. For example, user computing device 102 may send user input, such as queries and/or recurrent search schedules, to the search management system 100.

The example search management system 100 includes a search process manager 104, a user interface server 106, an alert manager 108, and search storage 116. In this embodiment, a user may perform operations via the user interface server 106 such as selecting data sources of interest, specifying one or more search terms, reviewing and/or editing previously created searches, and/or reviewing results of searches, as described in further detail herein. As illustrated, user created recurrent searches may be stored in search storage 116 as search objects 112. Search process manager 104 may access the search objects 112 to automatically query the data sources 122 via the search system 120. The search process manager 104 may store the search results 114 from the search system 120 in the search storage 116, cause presentation of the results in the user interface server 106, and/or distribute results via the alert system 130, each of which is as described in further detail herein. Additionally or alternatively, the search process manager 104 may store the search results 114 from the search system 120 in the data sources 122 of the search system 120.

In this embodiment, the search management system 100 communicates with the search system 120 and the alert system 130. For example, the search system 120 may be configured to query disparate data sources 122 in an efficient manner. The example alert system 130 may provide a user interface that enables users to view alerts and/or search results. In other embodiments, the search system 120 and/or the alert system 130 are optional and the search management system 100 may query the data sources 122 and/or present the user interfaces described herein.

Example Search Processes

Figure 2:
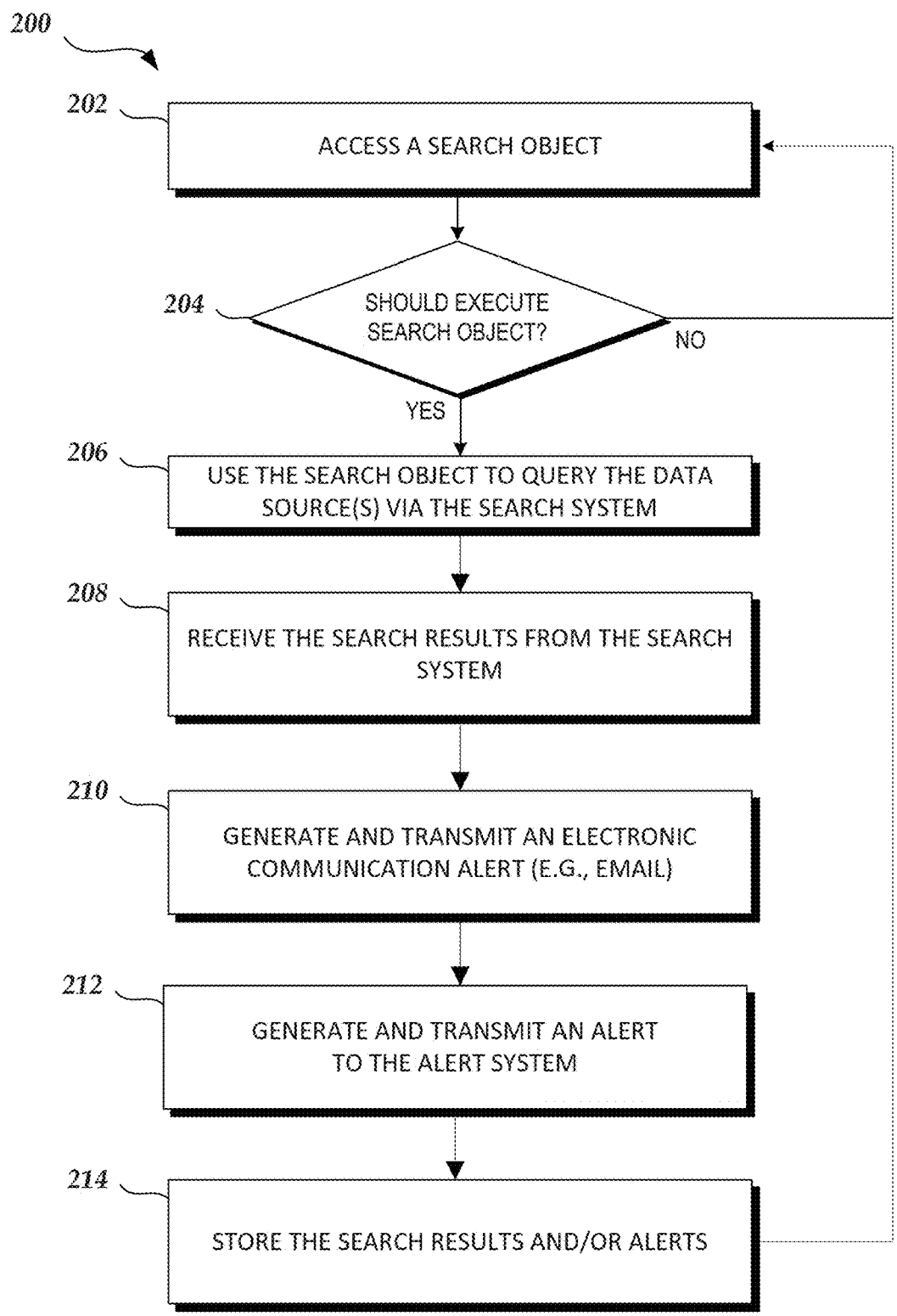
FIG. 2 is a flowchart of an example method of executing recurrent searches, according to some embodiments of the present disclosure.

FIG. 2 is a flowchart of an example method of executing recurrent searches, according to some embodiments of the present disclosure. Although the method is described in conjunction with the systems of FIG. 1, persons skilled in the art will understand that any system configured to perform the method, in any order, is within the scope of this disclosure. The method 200 may be performed by the systems 100, 120, or 130 of FIG. 1, such as the various components of the search management system 100 of FIG. 1 as discussed herein, including the search process manager 104, the user interface server 106, and/or the alert manager 108. Depending on the embodiment, the method 200 may include fewer or additional blocks and/or the blocks may be performed in order different than is illustrated.

Beginning at block 202, the search process manager 104 accesses a search object. A search object may be created and/or edited via the user interface server 106, which is described in greater detail with respect to FIGS. 4-7. The example search object 112A of FIG. 1 may illustrate various properties of a search object. For example, a search object may include a status property that indicates whether the search object is "enabled" or "disabled." The search object may specify: one or more search terms, such as an IP address, domain name, phone number, and/or any other strings; one more data sources; a frequency, such as a time frequency of thirty minutes or one hour; a parameter for when the search should expire, such as automatically becoming disabled; an event that may cause a search to run; a permissions group; and/or a last execution timestamp that indicates the last time a search was run. As will be described with respect to process 200, the search process manager 104 may continually poll the search storage 116 to access the search objects on a recurring basis.

At block 204, the search process manager 104 determines whether to initiate a search based on the accessed search object at block 202. For example, the search process manager 104 checks the status property and determines to initiate a search based on the search object if the status is "enabled." If the status is "disabled," the search process manager 104 exits the process loop and returns to block 202 process other search objects and/or this same search object at a later time (for example, the status of the search object may be changed from "disabled" to "enabled.") The search process manager 104 may also determine whether to initiate a search from the search object based on the current timestamp, and the frequency and the last execution timestamp properties of the search object. For example, the search object contains a frequency property for recurrent searches every fifteen minutes and a last execution timestamp of 2015-10-21 12:45:13 GMT. The search process manager 104 accesses the current timestamp. If the current timestamp is 2015-10-21 12:50:30 GMT, then the search process manager 104 does not initiate a search because the fifteen minute periodic time has not elapsed and the search process manager 104 exits the loop and returns to block 202. However, if the current timestamp is 2015-10-21 13:01:10 GMT, then the search process manager 104 determines that a search should be initiated and proceeds to the next block.

Additionally or alternatively, the search process manager 104 determines whether to initiate a search based on an event. For example, the accessed search object may include an event condition that may cause a search to run. Example events include a data sync event or a scheduled user downtime event. Example user downtime events include when a computing system for users is unavailable and/or a beginning time for when there is low usage by users of the computing system, e.g., after work hours, late at night, and/or early in the morning. Continuing with the example, the search process manager 104 may receive an indication or event and/or determine that the event has occurred, and then initiate a search based on the received indication or event and/or determination that the event has occurred. In some embodiments, it may be advantageous to initiate searches based on events. For example, initiating a search after a data sync may advantageously search the recently updated data. As another example, initiating a search after user downtime may advantageously avoid interfering and/or adversely affecting the user experience since searching the data sources may adversely affect the user experience due to performance impacts from the searching.

At block 206, the search process manager 104 uses the search object to query the one or more data sources via the search system. In some embodiments, the search system 120 includes an Application Programming Interface to receive the one or search terms, the one or more data sources, and other inputs. As discussed herein, the one or more data sources may include electronic logs. Further, the search system 120 may efficiently search the data source(s) to only search those data source entries that have a corresponding timestamp after the last execution timestamp of the search object. Accordingly, previously found search results are not included in the search results from the current periodic search. In other words, in some embodiments, the search process manager 104 searches the date ranges that it has not searched before. For example, if the search process manager 104 initiated a search at 10:00 and then initiated another search again at 10:15, the search process manager 104 would search the search system 120 for the specific search terms in the 10:00-10:15 time range. The most recently searched time or the last execution timestamp is tracked in the search object. Searching by the search system 120 may include textual, partial textual searching, geographic searching, searching using regular expressions, and/or searching using wildcards. For example, if the search string is "www.evil-.com," the search system 120 may search the one or more data sources for entries that match "www.evil.com" or a partial match such as "evil.com." Additional information regarding searching via indexes and other techniques is described in the '240 patent, e.g., see Col. 15 l. 41-Col. 22 l. 34.

In some embodiments, the search system 120 searches one or more disparate data sources in an efficient manner. The data sources may be from numerous devices from one or more entities, such as proxy logs, VPN logs, malware lists, badge logs, phone call logs, blacklists, whitelists, email logs, process logs, intrusion detection system logs, credit card transaction data, etc. The search system 120 may be agnostic to the type of data sources and may be capable of supporting searches for any types of data sources. The search system 120 may efficiently search a subset of a particular electronic log and not the entire electronic log. For example, the search system 120 may identify a subset of the electronic log entries that have corresponding timestamps after a particular time. Additionally or alternatively, the search system 120 may use indexes and/or checkpoints within the electronic logs and/or data structures corresponding to the electronic logs to efficiently search the electronic logs. As discussed herein, in other embodiments, the search management system 100 searches the data sources directly.

Additional information regarding searching large amounts of data, multiple data sources, and the search system 130 is found in U.S. Pat. Nos. 8,799,240; 9,092,482. For example, the '240 patent describes searching large amounts of data in Col. 3 l. 6-Col. 22 l. 34, and in particular describes using key-values to efficiently search multiple large data sources, each of which may be used by the search system 130. As another example, the '482 patent describes a efficiently scheduling queries of databases in Col. 3 l. 21-Col. 12 l. 34, which may be used by the search system 130.

In some embodiments, the search object supports complex logic for performing searches. For example, in addition to one or more search terms, the search object may include Boolean instructions for conducting searches. An example Boolean instruction includes Boolean algebra such as: "evil.com & !musicevil.com," which would match results with "evil.com" but excludes the domain name of "musicevil.com." Another example Boolean instruction would be to match a particular search term with another condition. In some embodiments, the complex logic may include conditional instructions based on data types. For example, in the same search object, different search terms may be specified for different data types and/or data sources. Continuing with the example, the search object may include the search instruction: "if type=IP address then 101.12.19.11; if type=domain then evil.com," which would instruct the system to search for "101.12.19.11" among IP address data types and/or data sources and to search for "evil.com" among domain data types and/or data sources.

At block 208, the search process manager 104 receives the search results from the search system 120. The example search result 114A of FIG. 1 may illustrate various properties of a search result. In some embodiments, the properties of a search result may be customized for a particular data type and/or data source. For example, as illustrated, example search result 114A includes properties such as the data source, computer name, IP address, and a timestamp from the respective electronic log and/or data source. Other example properties for search results include a person's name and/or identifier, a malware name and/or identifier, or any other property that may be associated with an electronic log.

At block 210, the alert manager 108 and/or alert system 130 generates and transmits an electronic communication alert. For example, an email alert may be transmitted to one or more email addresses corresponding to particular users and/or list serves. In some embodiments, the email alert contains information identifying the particular search object for which search results were found. Additionally or alternatively, the email alert includes the search results and/or excerpts from the electronic log corresponding to the search results. Additional information regarding electronic communication alerts are described in further detail with respect to FIG. 8. Other example electronic communication alerts include chat message notifications and/or text message alerts.

At block 212, the alert manager 108 generates and transmits an alert to the alert system 130. For example, the alert may include the search results and/or other information associated with the respective search object for the search result. The alert system 130 may include user interfaces for presenting the alert information. Additional information regarding alerts, user interfaces, and the alert system 120 are described in further detail with respect to FIGS. 9-11. Further, additional information regarding alerts, user interfaces, and the alert system 120 is found in U.S. patent application Ser. No. 14/579,752 entitled "Systems and User Interfaces For Dynamic And Interactive Investigation Of Bad Actor Behavior Based On Automatic Clustering Of Related Data In Various Data Structures" filed Dec. 22, 2014 ("the '752 application"), which is hereby incorporated by reference in its entirety and for all purposes. For example, the '752 application describes example user interfaces for an alert system in paragraphs [0214]-[0228], among others. As another example, the alert system 130 and/or the search management system 100 may perform the clustering methods and techniques described in paragraphs [0149]-[0160], among others, of the '752 application. For example, the alert system 130 may use the search result and/or properties from the search result (such as computer name, user name, IP address, etc.) as a seed for clustering, which is described in further detail in the '752 application.

In some embodiments, the alert manager 108 generates other forms of alerts other than those described up blocks 210 and 212. For example, the alert manager 108 generates textual alerts and/or other data object alerts for use by the search management system 100. For example, the search management system 100 may present the generated alerts via the user interface server 106 and/or may store the alerts in the search storage 116, which is described in further detail below. As discussed herein, at blocks 210 and 212 and/or during other alert distribution, the alert manager 108 uses the properties of the search objects, such as the recipients and/or the permissions of the respective search objects, to determine the recipients of the alerts.

At block 214, the alert manager 108 stores the search results and/or alerts in the search storage 116. In some embodiments, the search results and/or alerts may be viewed in a user interface. Additionally or alternatively, the search management system 100 may distribute the search results and/or alerts to users and/or to other systems. In some embodiments, some of blocks 210, 212, and/or 214 are optional. For example, the alert manager 108 may send one alert instead of multiple alerts via different systems. Accordingly, following the sending of one or more alerts, process 200 returns to block 202 to continue checking and conducting recurrent searches. For example, the search object with a frequency property of 15 minutes will cause a search to be executed by the search process manager approximately every 15 minutes. In some embodiments, if there are no search results based on a particular search then no alerts will be sent.

Access Control

Figure 3:
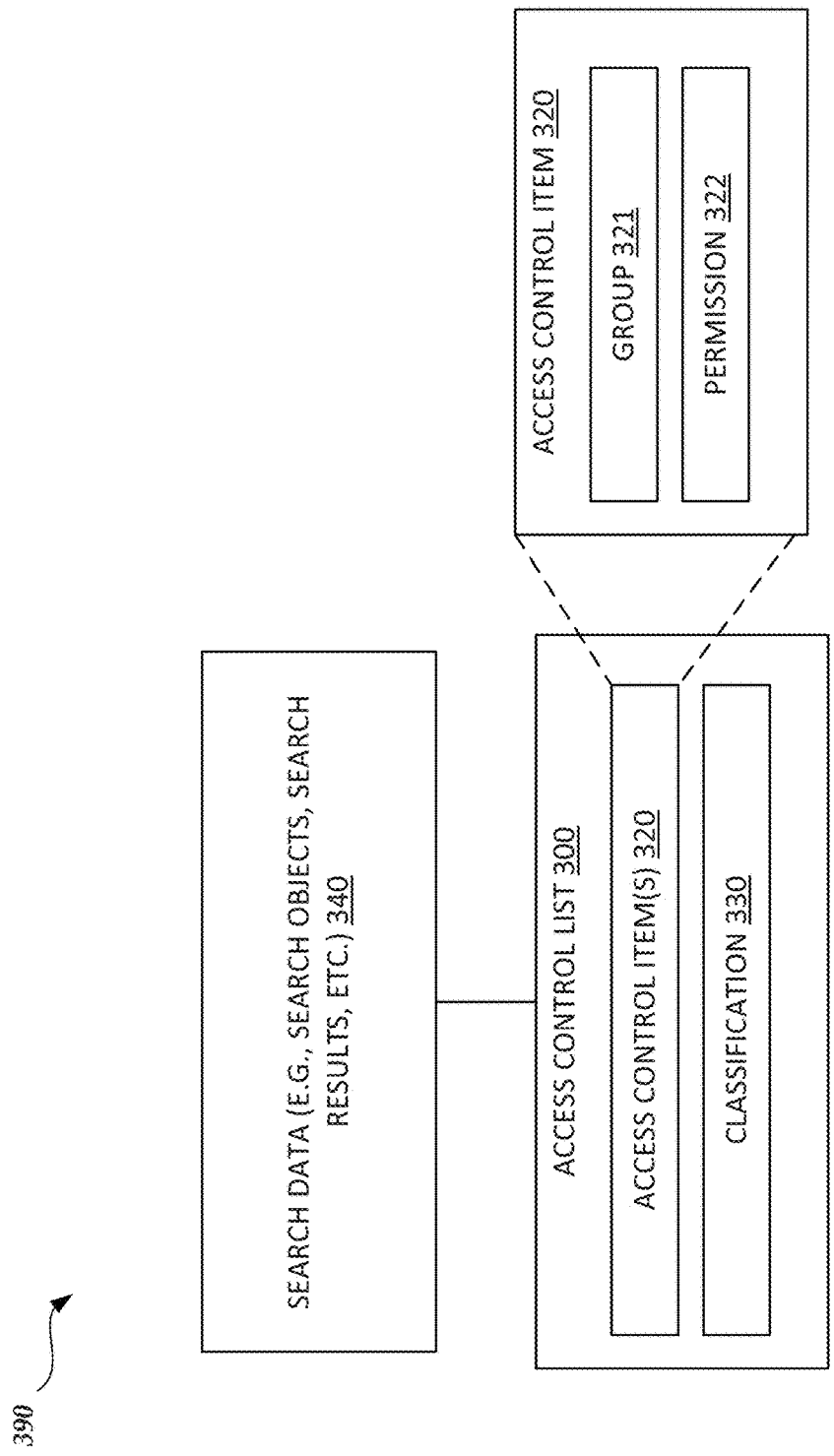
FIG. 3 is a block diagram illustrating an example access control list for search data, according to some embodiments of the present disclosure.

FIG. 3 is a block diagram illustrating an example access control list for search data, according to some embodiments of the present disclosure. In some embodiments, the search management system 100 uses access control lists to allow a user to specify which other users and/or teams are permitted to view search data, such as search objects and/or search results. Additionally or alternatively, access control lists may further specify the permissions of particular users to view and/or modify search data such as search objects. Access control environment 390 includes search data 340 and access control list 300. In some embodiments, access control list 300 is stored in a data store and/or data source of the search management system 100. Example access control list 300 includes one or more access control items 320 and zero or more classifications 330. Example access control list 300 is associated with one or more search data, such as search data 340. Thus, example access control list 300 of the search management system 100 provides a level of granularity to specify sharing rules and/or permissions on a per-data item basis. For example, during the creation and/or editing of a search object, a user may specify a group corresponding to the search object, as described in further detail with respect to FIG. 6. Accordingly, the users belonging to that group may view the search results and/or edit the search object.

Example access control item 330 includes group 321 and permission 322. Example group 321 identifies a set of users and/or teams. Example permission 322 identifies an operation that a user in the set can perform on search data 340. Additionally or alternatively, example permission 322 further identifies an operation the user in the set can perform on access control list 300. Non-limiting examples of permission 322 include read, write, owner, create, delete, read only, and/or some combination thereof.

In some embodiments, if access control list 300 has a classification 330, then a user must be authorized for the classification 330. Thus, classification 330 may override permission 322 granted to the entity and/or user. For example, one possible set of classification markings as part of classification 330 include "Top Secret," "Secret," "Confidential," "Restricted," "For Official Use Only," among others, while another example classification scheme may use the markings: "Public" and "Restricted," among others. For example, the permissions of an access control list may indicate that a particular data object should not be shared with particular users.

Example Search Management User Interfaces

FIGS. 4-7 illustrate example user interfaces of the search management system, according to some embodiments of the present disclosure. In various embodiments, aspects of the user interfaces may be rearranged from what is shown and described below, and/or particular aspects may or may not be included. However, the embodiments described below in reference to FIGS. 4-7 provides example user interfaces of the system.

Figure 4:
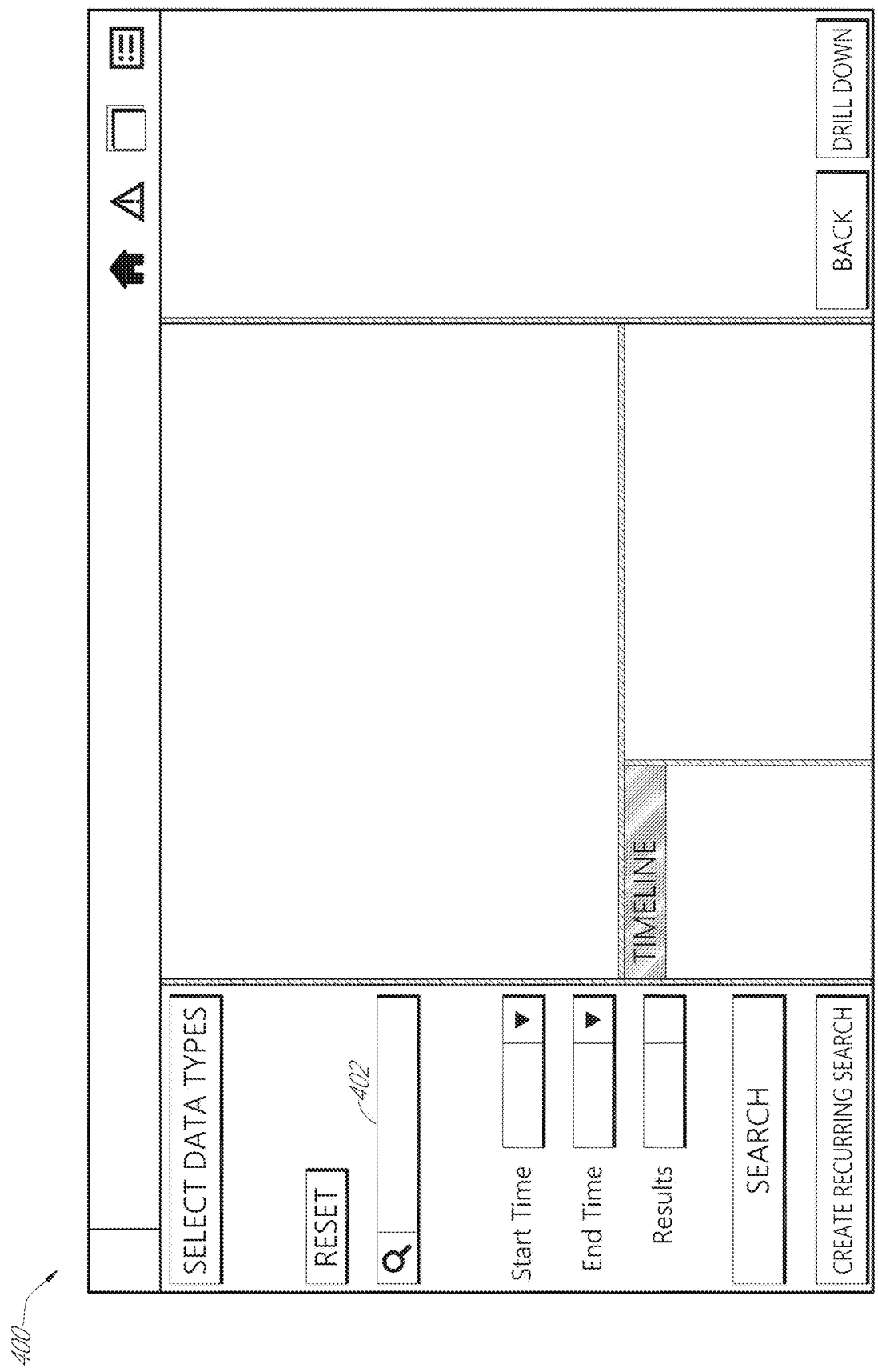
FIGS. 4, 5, 6, and 7 illustrate example user interfaces of the search management system, according to some embodiments of the present disclosure.

FIG. 4 illustrates a user interface 400 of the search management system 100 that enables a user to dynamically search one or more data sources and/or to schedule recurrent searches, according to some embodiments of the present disclosure. For example, search area 402 may enable a user to enter a search string. The user interface 400 also may enable a user to search preexisting search objects by name, search string, author, group, and/or any other property of the search object.

Figure 5:
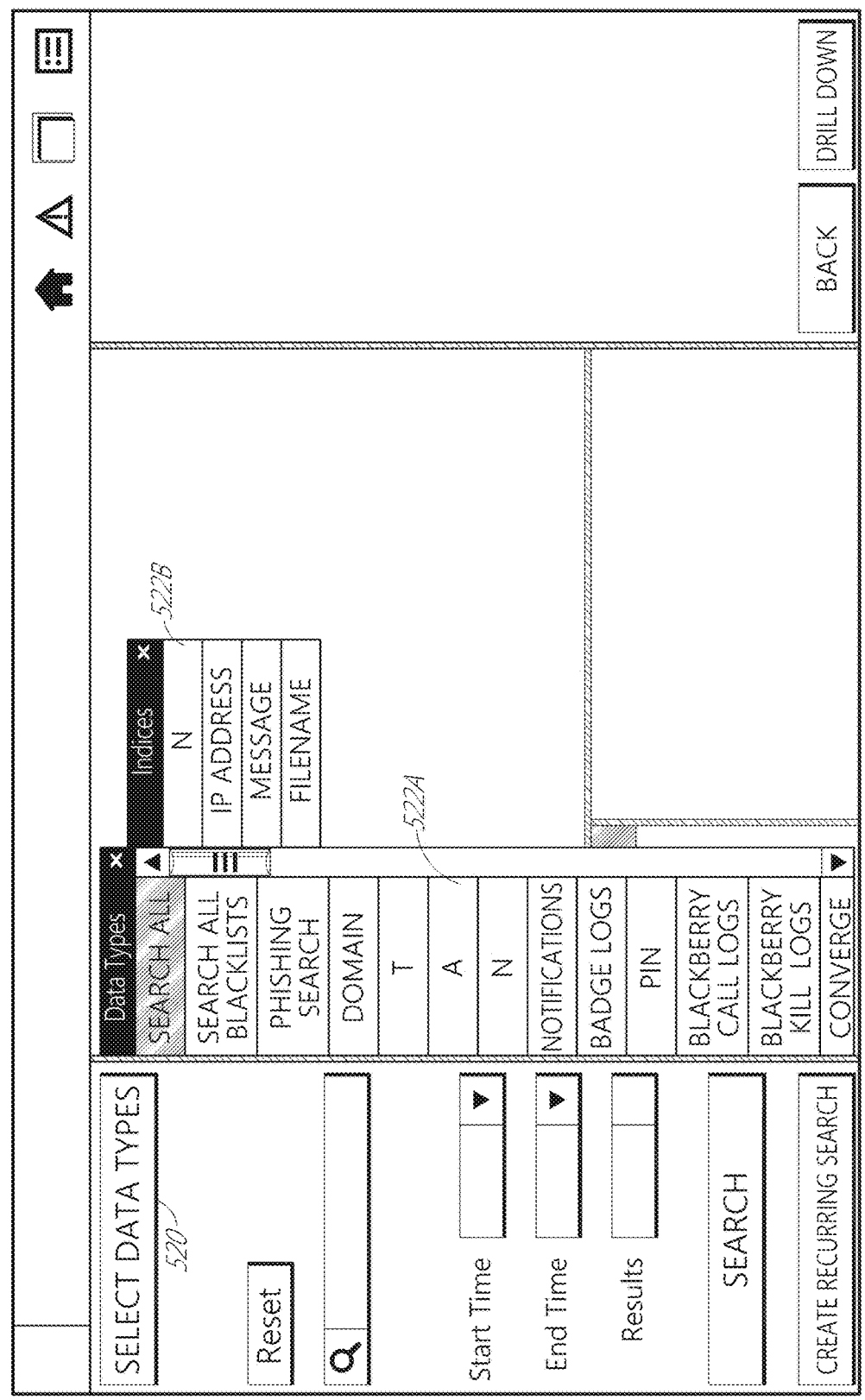

FIG. 5 illustrates another user interface 500 of the search management system 100. For example, the user interface elements of the user interface 500 may be similar to the user interface elements of the user interface 400 of FIG. 4. A user may select a data type selector 520 of the user interface 500, which may cause presentation of a hierarchical data type menu 522. In some embodiments, a user may select one or more data types and/or each data type may correspond to one or more data sources. As illustrated, a particular data type and/or multiple data types may have indexes for searching, where the index may correspond to particular properties of the electronic logs. For example, if a user wants to set up a recurrent search on proxy traffic, the user may user may select "Proxy (ALL)" data type and then select an "index" from the index menu 522B that includes "Domain/URL," "Source/Remote IP Address," "Source Host," "Category," or "Port." Thus, a user may set up a recurrent search for a known malware domain such as "evil.com" or "http://5.10.22.79."

Figure 6:
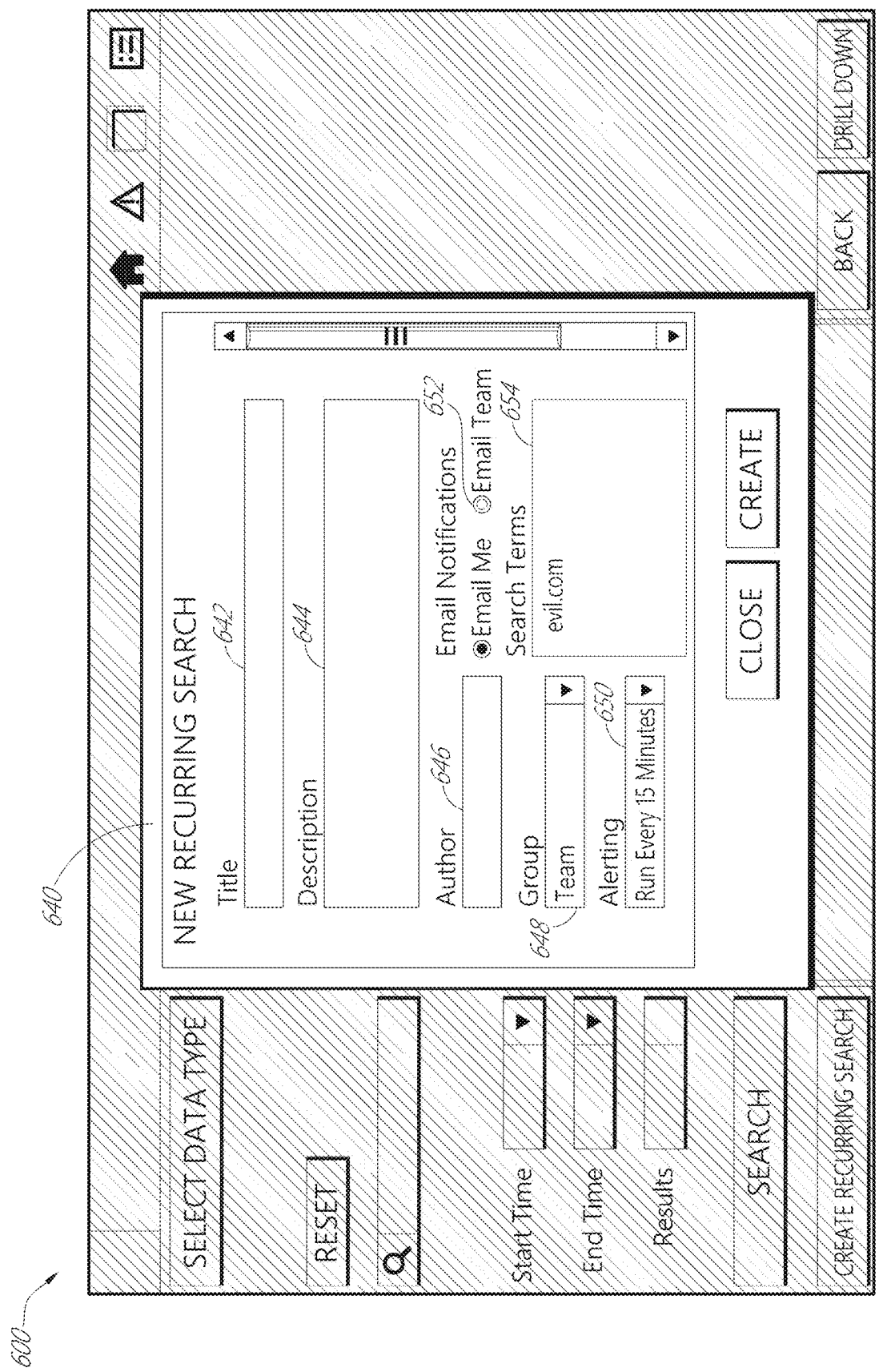

FIG. 6 illustrates a user interface 600 of the search management system 100 that enables a user to set up a recurrent search. Example user interface 600 includes input areas and/or selectors that enable user to create a recurrent search, which may correspond to a search object and its corresponding properties as described herein. For example, a recurrent search form 640 may include input areas such as: title input area 642 that corresponds to a title for the recurrent search; a description input area 644 that corresponds to a description of the recurrent search; author input area, which may be automatically populated with an identifier corresponding to the current user; a group selection area 648 that enables a user to select one or more groups that are permission to view the corresponding search object and/or search results; a frequency input selector 650 that enables a user to select the frequency of searching, such as "Run Every 15 Minutes," "Run Every 30 Minutes," etc.; an electronic communication preference selector 652 enables a user to select themselves or a team to receive electronic communication alerts; a search term input area 654 that enables a user to specify one or more search terms, such as "evil.com" or other input expressions (e.g., a regular expression and/or search term with a wildcard). While not illustrated, the recurrent search form 640 may include a listing of the data types and/or data sources for searching and/or a selector to allow a user to select the data types and/or data sources for recurrent searching.

Figure 7:
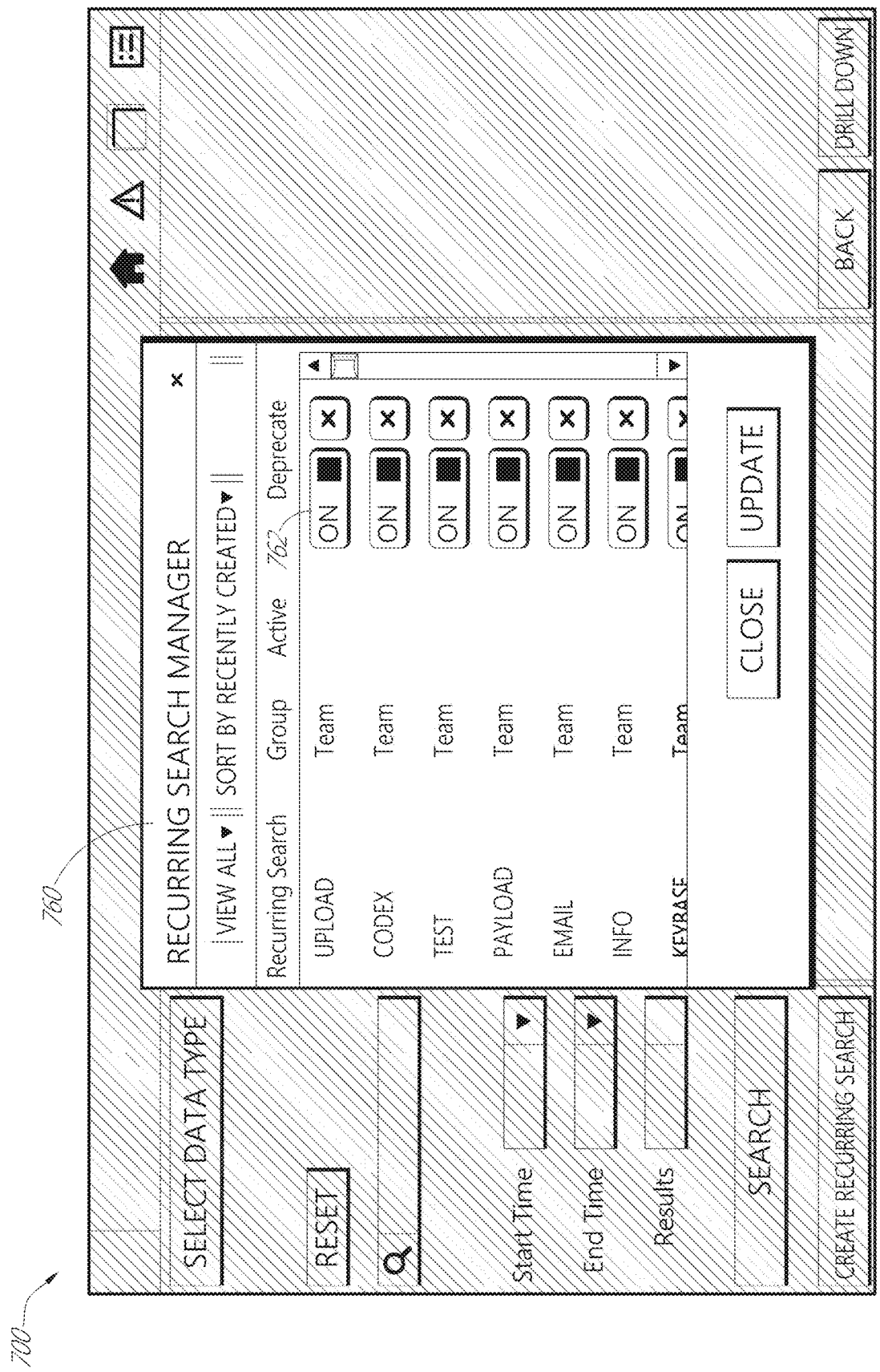

FIG. 7 illustrates a user interface 700 of the search management system 100 that enables a user to manage their recurrent searches. For example, user interface 700 includes a recurrent search management menu 760 that enables a user to disable one or more recurrent searches via a status selector 762. In example user interface 700, the recurrent search management menu 760 displays the recurrent searches that have been set up by user and/or the recurrent searches that a user is permissioned to view. The permissioned view may be based on the access control list 300 described with respect to FIG. 3. In some embodiments, recurrent search management menu 760 displays those recurrent searches that have received search results and/or have alerts (not illustrated). For example, the user interfaces of FIGS. 9, 10, and/or 11 may be integrated into user interface 700 (or vice versa).

Example Electronic Communication Alerts

FIG. 8 illustrates example electronic communication alerts, according to some embodiments of the present disclosure. FIG. 8 includes example electronic communication alerts 800 and 850 that may be generated by the recurrent search process 200 of FIG. 2 and block 210 described herein. As illustrated, electronic communication alert 800 may be an email format. Alert 800 may include a message 802 that indicates the search management system 100 as identified alerts the particular recurrent search "Group Test Hits." Alert 800 may include links that enable user to view the search results and/or edit the recurrent search. For example, link 804A may enable user to view the alert and/or search results in the alert system, which is described herein and with respect to FIGS. 9 and 10 in particular. Link 806A may enable user to view the alerts in alert inbox of the alert system, which is described in further detail with herein and with respect to FIGS. 11A-11B. Link 808A may be able the user to manage and edit their recurrent searches in the user interface of the search management system 100, such as user interface 700, which is described in further detail with respect to FIG. 7.

In other embodiments, the search management system 100 may send electronic communication alert 850 that includes the search results and/or excerpts from a log file. For example, elements of the example electronic communication alert 850 may be similar to electronic communication alert 800, such as similarities between links 804A, 806A, and 808A of alert 800 and links 854A, 856A, and 858A of alert 850, respectively. Alert 850 may include search results 852 that displays portions of the electronic log where there was a positive match based on the search object. In some embodiments, search results 852 may include a portion of the search results. For example, search results 852 may include a predefined and/or configurable number of search results, such as the 100 most recent entries from the electronic log. The search results 852 of the electronic communication may be configurable. For example, an administrator may configure the electronic communication to omit particular columns from the search results 852. As illustrated in the body of the communication alert 850, the communication alert 850 may report new results as compared to a previous search, which may correspond to the example process as described in further detail with respect to FIG. 14.

The example search results 860 illustrate another example table that may be included in the communication alert 850. For example, instead of listing IP addresses as shown in the search results 852, the search results 860 may list license plate identifiers corresponding to geographic coordinates such as latitudinal and longitudinal coordinates. As described herein, the search management system 100 may be capable of scheduling recurrent searches to identify data entries that correspond to a geographic location and/or area.

In some embodiments, the electronic communication alerts may be configurable. For example, the search management system 100 may allow users and/or administrators to configure the electronic communication alerts. Continuing with the example, a user and/or administrator may specify the information and/or links in the electronic communication alerts, such as any of the information and/or features in the user interfaces described herein.

Example Alert User Interfaces

FIGS. 9-11 illustrate example user interfaces of the alert system, according to some embodiments of the present disclosure. In various embodiments, aspects of the user interfaces may be rearranged from what is shown and described below, and/or particular aspects may or may not be included. However, the embodiments described below in reference to FIGS. 9-11 provides example user interfaces of the system.

FIG. 9 illustrates a user interface 900 of the alert system 130 that enables a user to view an alert generated by the search management system 100, according to some embodiments of the present disclosure. Further, additional information regarding embodiments of alert user interface 900 is found in U.S. patent application Ser. No. 14/579,752. For example, the '752 application describes embodiments of user interface 900 for an alert system in paragraphs [0217]-[0219], among others.

FIG. 10 illustrates a user interface 1000 of the alert system 130 that enables a user to view the search results from the search management system 100 and/or the search system 120, according to some embodiments of the present disclosure. Further, additional information regarding embodiments of results user interface 1000 is found in U.S. patent application Ser. No. 13/968,752. For example, the '752 application describes embodiments of user interface 1000 for an alert system in paragraphs [0220]-[0223], among others.

Figure 11A:
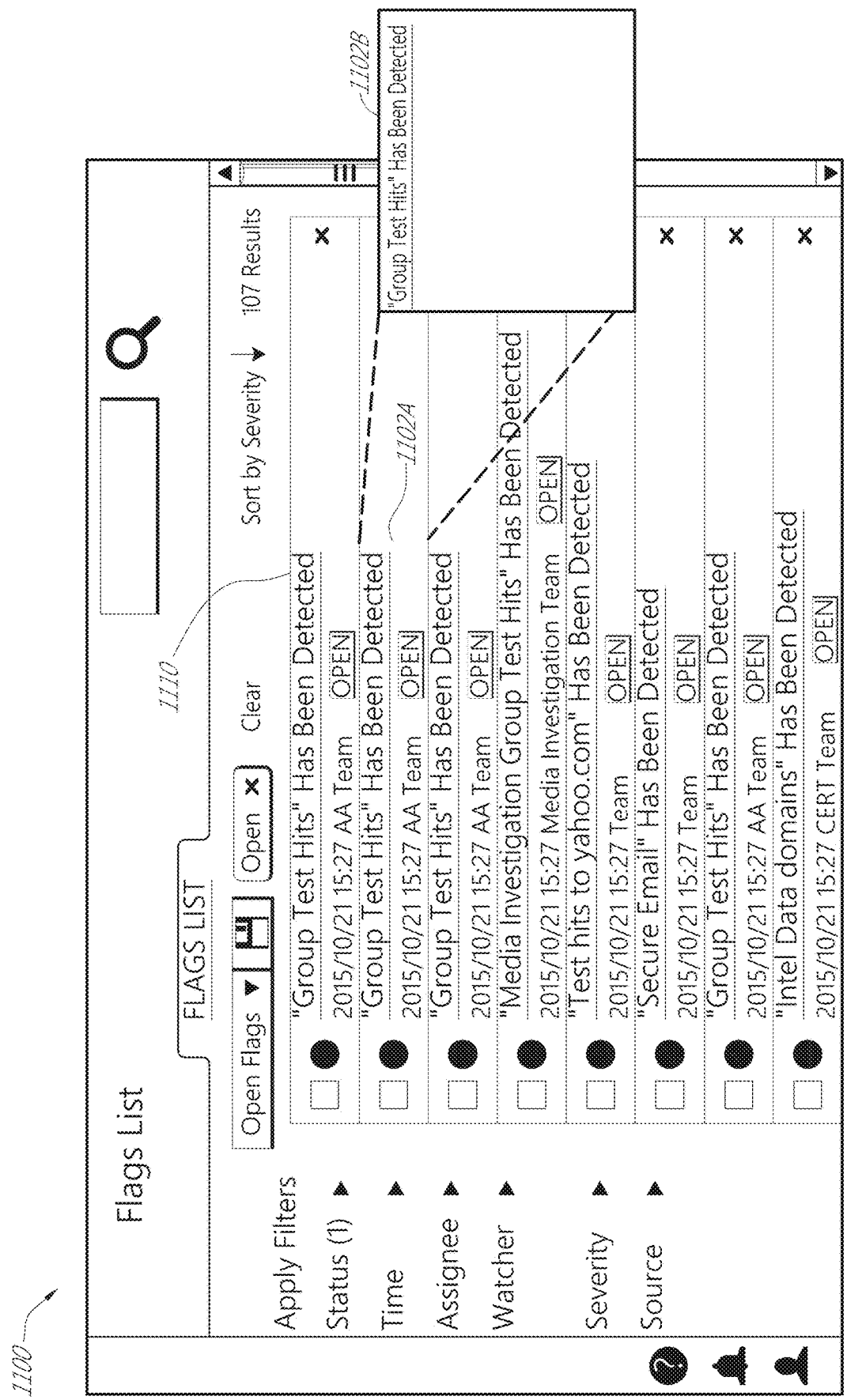

FIG. 11A illustrates a user interface 1100 of the alert system 130 that enables a user to view an alert inbox containing alerts from the search management system 100, according to some embodiments of the present disclosure. In some embodiments, user interface 1100 presents an alert 1102 within alert inbox 1110. In some embodiments, the alert 1102 is cumulative. For example, if a search object causes search results to be found at two discrete times, such as 1 PM and 2 PM, then alert 1102 may represent and enable a user to view both search results cumulatively. For example, by selecting alert 1102A in FIG. 11A, an exploded alert view 1102B, as shown in detail in FIG. 11B, may be presented to the user in the alert inbox 1110 of user interface 1100. A user may then navigate to user interfaces 900 and/or 1000 from user interface 1100 to further investigate the alert. Further, additional information regarding embodiments of results user interface 1100 is found in U.S. patent application Ser. No. 14/579,752. For example, the '752 application describes embodiments of user interface 1100 for an alert system in paragraphs [0215], [0216], and [0224]-[0228], among others.

In some embodiments, user interfaces 900, 1000, and/or 1100 may be configured via the alert system 130 to display search results and/or alerts based on permissions. For example, a search object may be configured to not only particular user, however, the permissions associated with the search object may enable the user to view the search results and/or alerts and user interfaces 900, 1000, and/or 1100 because the user may belong to the permissioned group. A permissioned group may be based on the access control list 300 as described herein with respect to FIG. 3.

Additional Embodiments

Embodiments of the present disclosure relate to a search management system that may automatically search multiple data sources and may be capable of detecting retrospective changes to a data source. For example, data may be back-filled in a data source and the recurrent searches of the search management system may be capable of detecting a matching search result within the backfilled data. The search management system may be able to determine search results in a memory-efficient and/or resource-efficient manner. In some embodiments, the capability to identify search results retrospectively, such as in the case of backfilled data, may occur alternatively or additionally to the processes of avoiding recurrent searches of previously searched data, as described herein.

Additional Example Search Management Systems

Figure 13:
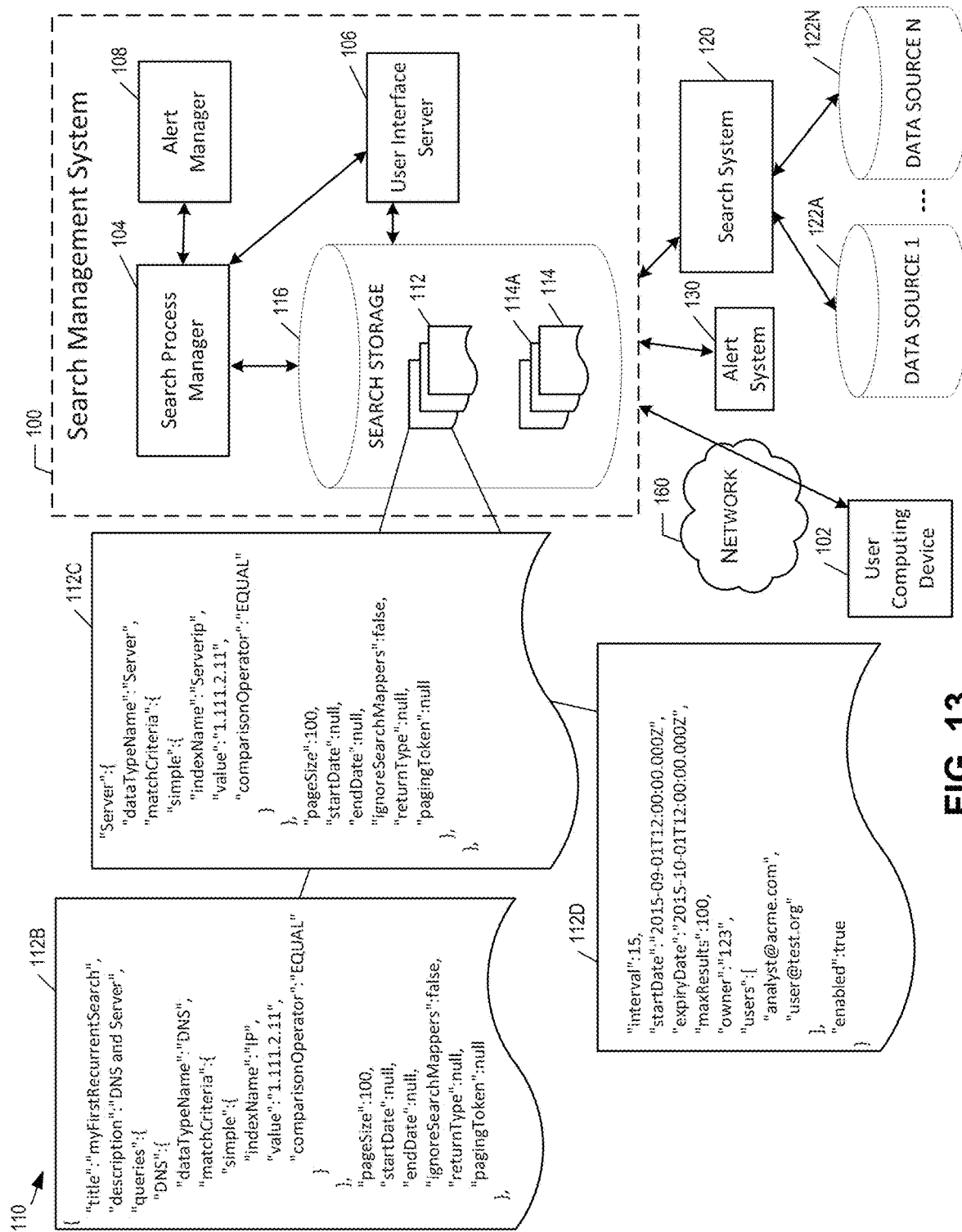
FIG. 13 is a block diagram illustrating another example search management system, according to some embodiments of the present disclosure.

FIG. 13 illustrates a search management system 100, according to some embodiments of the present disclosure. The embodiment of FIG. 13 may be similar to the embodiment of FIG. 1. For example, in the embodiment of FIG. 13, the database environment 110 includes a network 160, a search management system 100, user computing device 102, a search system 120, and an alert system 130. Various communications between these devices are illustrated. For example, user computing device 102 may send user input, such as queries and/or recurrent search schedules, to the search management system 100.

As illustrated, user created recurrent searches may be stored in search storage 116 as search objects 112. For example, the search object 112B-112D may represent various properties of a search object. In the example, the search object 112B-112D may be stored and/or accessed in a JavaScript Object Notation (JSON) data format. The example search object 112B-112D includes one or more "queries." An example query may specify a data source to be queried and one or more matching criteria, which may include one or more comparison operators. For example, various matching criteria may correspond to textual matching, partial textual matching, geographic matching at one or more coordinates and/or within a geographic area, matching using regular expressions, and/or matching using wildcards. The search object 112B-112D may specify: one or more indices of a data source; a frequency; a parameter for the oldest search results to look for; a parameter for when the search should begin; a parameter for when the search should expire ("expiryDate"), such as automatically becoming disabled; a predetermined and/or maximum number of results to return; one or more recipients; an event that may cause a search to run; and/or a permissions group. Search process manager 104 may access the search objects 112 to automatically query the data sources 122 via the search system 120.

As described herein, the search process manager 104 may store the search results 114 from the search system 120 in the search storage 116. For example, for a current search, the search results 114 may be stored and/or serialized to the search storage 116. In some embodiments, the most recent search results 114 may replace previous search results to conserve memory resources. The search process manager 104 may cause presentation of the results in the user interface server 106, and/or distribute results via the alert system 130, each of which is as described in further detail herein. In some embodiments, the user interface server 106 and/or the search management system 100 enables a user the capability of row-by-row deletion of data entries in the data sources 122.

In some embodiments, the search management system 100 enables a user to search using a "tag." A tag may be a data structure identifying multiple related indices from multiple data types and/or data sources. For example, "IP" or "domain name" indices may be found in multiple discrete data types and/or data sources. Thus, a tag for "IP" indices in multiple data types and/or data sources may enable searching of multiple data types and/or data sources at once for the same search term and/or parameter. A recurring search may also be configured with a search object that includes one or more search terms and/or parameters for one or more tags.

Additional Example Search Processes

Figure 14:
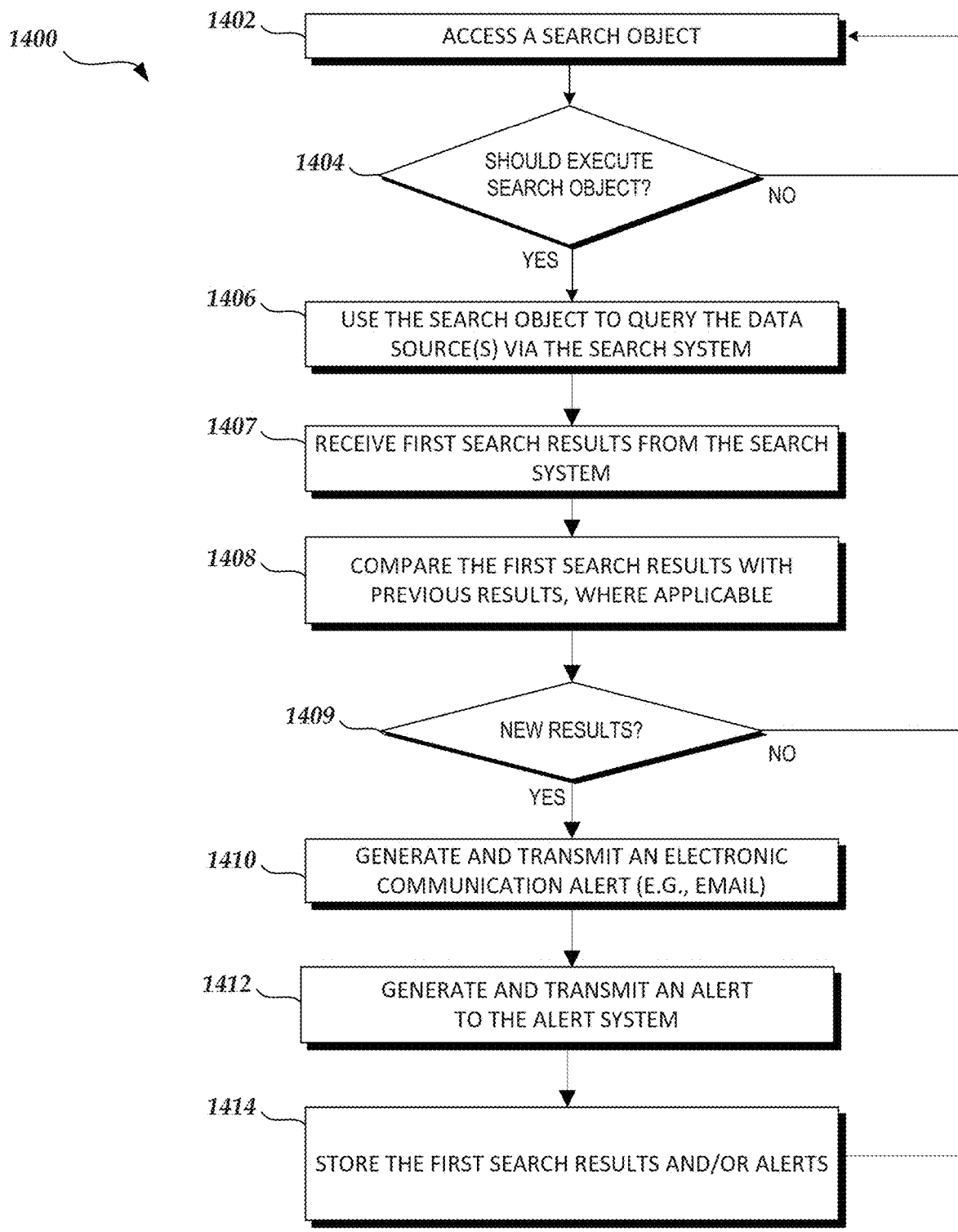
FIG. 14 is a flowchart of another example method of executing recurrent searches, according to some embodiments of the present disclosure.

FIG. 14 is a flowchart of another example method of executing recurrent searches, according to some embodiments of the present disclosure. Although the method is described in conjunction with the systems of FIGS. 1 and/or 13, persons skilled in the art will understand that any system configured to perform the method, in any order, is within the scope of this disclosure. The method 1400 may be performed by the systems 100, 120, or 130 of FIGS. 1 and/or 13, such as the various components of the search management system 100 of FIGS. 1 and/or 13 as discussed herein, including the search process manager 104, the user interface server 106, and/or the alert manager 108. Depending on the embodiment, the method 1400 may include fewer or additional blocks and/or the blocks may be performed in order different than is illustrated.

Beginning at block 1402, the search process manager 104 accesses a search object. A search object may be created and/or edited via the user interface server 106, which is described in greater detail with respect to FIGS. 4-7 and 15-17. The example search object 112A of FIG. 1 and/or the example search object 112B-112D of FIG. 13 may illustrate various properties of a search object. For example, a search object may include a status property that indicates whether the search object is "enabled" or "disabled." The search object may specify: one or more search terms, such as an IP address, domain name, phone number, and/or any other strings; one or more queries; one or more indices of the data source; one or more match criterion; one or more comparators; one more data sources; a frequency, such as a time frequency of thirty minutes or one hour; a parameter for the oldest search results to look for; a parameter for when the search should begin; a parameter for when the search should expire, such as automatically becoming disabled; a predetermined and/or maximum number of results to return; one or more recipients; an event that may cause a search to run; and/or a permissions group. In some embodiments, the search object includes an execution condition that indicates when the search process manager 104 should execute one or more queries of the search object. As described herein, the execution condition may specify a frequency or an event that causes the query execute. As will be described with respect to process 1400, the search process manager 104 may continually poll the search storage 116 to access the search objects on a recurring basis.

At block 1404, the search process manager 104 determines whether to initiate a search based on the accessed search object at block 1402. For example, the search process manager 104 checks the status property and determines to initiate a search based on the search object if the status is "enabled." If the status is "disabled," the search process manager 104 exits the process loop and returns to block 1402 process other search objects and/or this same search object at a later time (for example, the status of the search object may be changed from "disabled" to "enabled.") The search process manager 104 may also determine whether to initiate a search from the search object based on a current timestamp, the start and/or expiration dates of the search object, the frequency the search object, an event, and/or a last execution timestamp associated with the search object. In one example, the example search object contains a frequency property for recurrent searches every fifteen minutes and there is an associated last execution timestamp of 2015-10-21 12:45:13 GMT. The search process manager 104 accesses the current timestamp. If the current timestamp is 2015-10-09 12:50:30 GMT (and the start and expiration dates are 2015-09-01 00:00:00 and 2015-10-01 00:00:00, respectively), then the search process manager 104 does not initiate a search because the fifteen minute periodic time has not elapsed and the search process manager 104 exits the loop and returns to block 202. However, if the current timestamp is 2015-10-21 13:01:10 GMT, then the search process manager 104 determines that a search should be initiated and proceeds to the next block. As described herein, the search process manager 104 may evaluate an execution condition of the search object to determine whether to initiate a search. For example, initiating a search after receiving and/or determining an event has occurred, which is described in further detail with respect to block 204 of FIG. 2.

At block 1406, the search process manager 104 uses the search object to query the one or more data sources via the search system. In some embodiments, the search system 120 includes an Application Programming Interface to receive the one or search terms, the one or more data sources, and other inputs. As discussed herein, the one or more data sources may include electronic logs. The search system 120 may search the entire data sources, such as electronic logs, for the one or more search terms. Additionally or alternatively to block 206 of FIG. 2, block 1406 may identify search results that precede the last execution timestamp. For example, by retrieving all matching results regardless of a time property associated with data in the data sources, data may be back filled into the data source and the search process manager 104 may identify new search results even though the data source may contain entries with timestamps before the last execution timestamp, but that were inserted into the data source after the most recent search execution and/or out of order. Accordingly, previously found search results could be included in the present search results from the current periodic search. In some embodiments, a configurable threshold of maximum and/or predefined results may be used by the search process manager 104 and/or system 120. For example, the maximum number of results may be set to 100. In the example, the search system 120 may query the data sources for the first 100 matching results. Alternatively, the search system 120 may retrieve all matching results and the maximum number of results may be determined at a later block, such as block 1407, as described herein. Searching by the search process manager 104 and/or the search system 120 may include textual, partial textual searching, geographic searching, searching using regular expressions, and/or searching using wildcards. For example, if the search string is "www.evil.com," the search system 120 may search the one or more data sources for entries that match "www.evil.com" or a partial match such as "evil.com." Additional information regarding searching via indexes and other techniques is described in the '240 patent, e.g., see Col. 15 l. 41-Col. 22 l. 34 or in the '882 application, e.g., see paragraphs [0058]-[0135].

At block 1407, the search process manager 104 receives the search results from the search system 120. In FIG. 14, the "first search results" at blocks 1407, 1408, and 1414 may refer to the current search results. The example search result 114A of FIG. 1 and/or FIG. 13 may illustrate various properties of a search result. In some embodiments, the properties of a search result may be customized for a particular data type and/or data source. For example, as illustrated, example search result 114A includes properties such as the data source, computer name, IP address, and a timestamp from the respective electronic log and/or data source. Other example properties for search results include a person's name and/or identifier, a malware name and/or identifier, or any other property that may be associated with an electronic log. In some embodiments, since the search system 120 may identify results from any time period, the example search result 114A may be identified from a current search (such as a search occurring on 2015-10-25), even though the example search result 114A has a timestamp that precedes the current time (such as a timestamp of 2015-10-21 13:13:56 GMT). Moreover, in some embodiments, the particular data entry corresponding to the example search result 114A may have been backfilled to the data source (such as the data being added on 2015-10-24), and the current search (such as occurring on 2015-10-25) may identify a new search result corresponding to the recently added data. In the example, the backfilled data entry, which corresponds to the search result 114A, may predate a previous search (such as a previous search occurring on 2015-10-23, for example); however, since subsequent searches can search retrospectively and can detect new data entries regardless of those new entries' timestamps, the backfilled data entry may be detected in the current search. As discussed herein, the search process manager 104 may limit the number of results to a predetermined maximum number of results. For example, the maximum number of results may be limited to a configurable number of 100, 1000, 10000, or 100000 results. Accordingly, example process 1400 may efficiently determine a sliding window of a predefined number of results based on each time the search process manager 104 initiates a new search.

At block 1408, the search process manager 104 compares the current search results with previous search results, where applicable. For example, the search results may be in a data object format. Example data object formats include Java or C #data objects. As described herein, previous search results may be accessed in a data object format. Accordingly, the search process manager 104 may compare the current search results and the previous search results. An example comparison may be a Set comparison, such as a Java Set comparison operation. If this is the first time that a recurrent search detects results than no comparison is necessary and the current search results would be new results and the search process manager 104 would proceed to block 1410. As described herein, in some embodiments the search results may be serialized and/or stored in a serialized data format in the search storage 116. Accordingly, the previous search results may be deserialized from the search storage 116 into data objects for comparison in block 1408.

At block 1409, based on the comparison at block 1408, the search process manager 104 determines if there any new results and/or any change in results. For example, the comparison at block 1408, such as a Set comparison, determines that there any new data objects in the current search results as compared to the previous search results. If there are no new search results, the search process manager 104 returns to block 1402. Returning to block 1402 after block 1409 may efficiently process the search results because blocks 1410, 1412, and/or 1414 may be skipped, which may conserve resources and/or reduce processor usage. If there are new search results, the search process manager 104 proceeds to block 1410.

At block 1410, the alert manager 108 generates and transmits an electronic communication alert. For example, an email alert may be transmitted to one or more email addresses corresponding to particular users and/or list serves. In some embodiments, the email alert contains information identifying the particular search object for which search results were found. Additionally or alternatively, the email alert includes the search results and/or excerpts from the data source(s) corresponding to the search results. Additional information regarding electronic communication alerts are described in further detail with respect to FIG. 8. Other example electronic communication alerts include chat message notifications and/or text message alerts.

At block 1412, the alert manager 108 and/or alert system 130 generates and transmits an alert to the alert system 130. For example, the alert may include the search results and/or other information associated with the respective search object for the search result. The alert system 130 may include user interfaces for presenting the alert information. Additional information regarding alerts, user interfaces, and the alert system 120 are described in further detail with respect to FIGS. 9-11. Further, additional information regarding alerts, user interfaces, and the alert system 120 is found in U.S. patent application Ser. No. 14/579,752. For example, the '752 application describes example user interfaces for an alert system in paragraphs [0214]-[0228], among others. As another example, the alert system 130 and/or the search management system 100 may perform the clustering methods and techniques described in paragraphs [0149]-[0160], among others, of the '752 application. For example, the alert system 130 may use the search result and/or properties from the search result (such as computer name, user name, IP address, etc.) as a seed for clustering, which is described in further detail in the '752 application. In some embodiments, the alert system 130 may be capable of sending electronic communication alerts.

At block 1414, the alert manager 108 stores the search results and/or alerts in the search storage 116. For example, the current search results may be stored in the search storage 116. An example method for storing search results that are in a data object format may be serializing the objects and storing the serialized objects in the search storage 116. In some embodiments, the serialized search results may replace the previous search results in the search storage 116 to conserve memory resources in the search storage 116.

Accordingly, the next time the current search runs, the search process manager 104 may retrieve the previous results from the search storage 116, at block 1408, such as by converting the serialized results into data objects also known as deserialization. In some embodiments, block 1414 may be executed any time search results are retrieved, thereby storing search results after any run, instead of being stored when there are new results as illustrated in the example method 1400. In some embodiments, search results in the search storage 116 may not be discarded and/or replaced. For example, the search results for each recurrent search may be stored for a period of time. Block 1414 may be similar to block 214 of FIG. 2.

Additional Example Search Management User Interfaces

FIGS. 15-18 illustrate additional example user interfaces of the search management system, according to some embodiments of the present disclosure. In various embodiments, aspects of the user interfaces may be rearranged from what is shown and described below, and/or particular aspects may or may not be included. However, the embodiments described below in reference to FIGS. 15-18 provides example user interfaces of the system.

Figure 15:
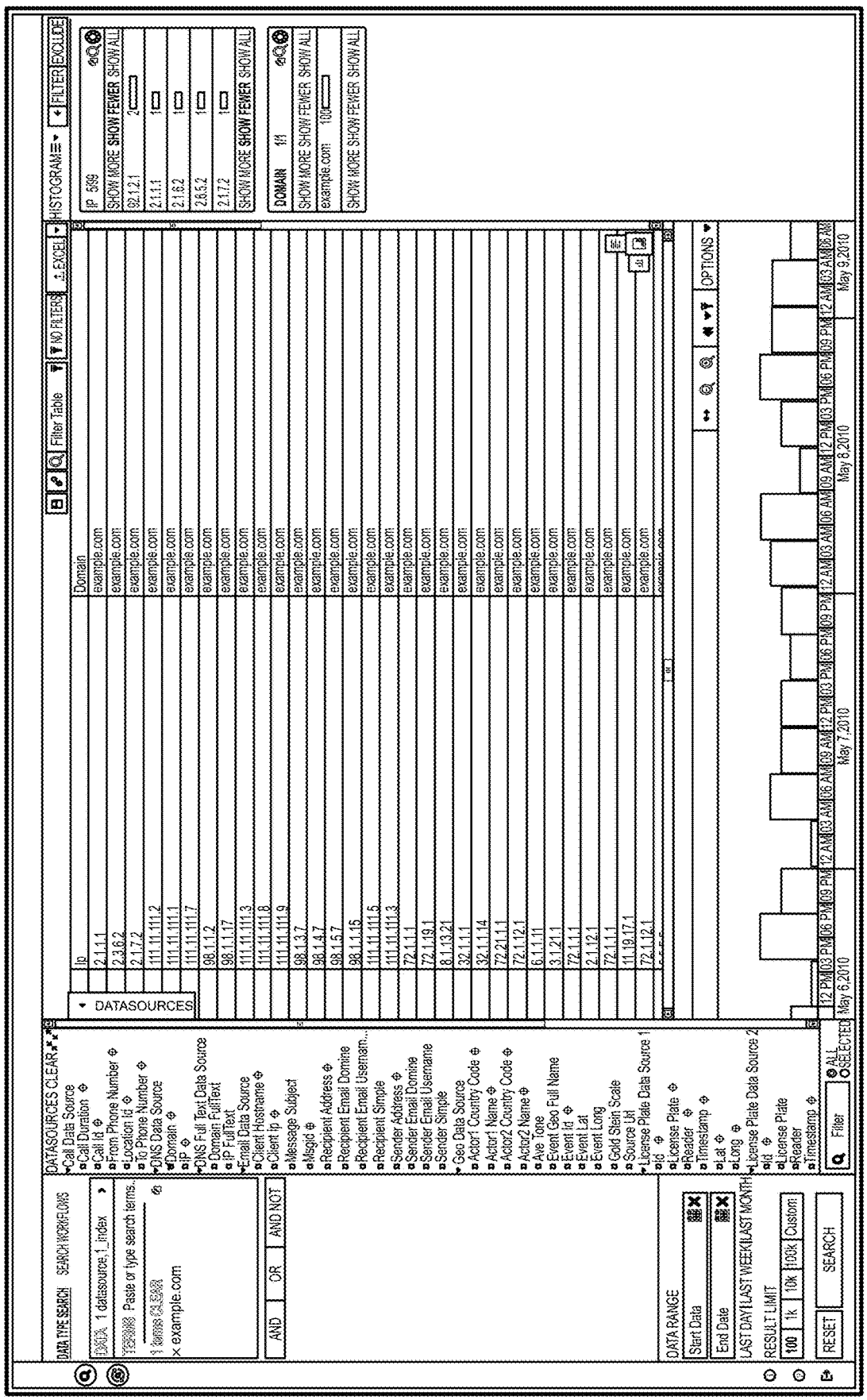

FIG. 15 illustrates an example user interface of the search management system 100 that enables a user to dynamically search one or more data sources and/or to schedule recurrent searches, according to some embodiments of the present disclosure. For example, as illustrated, a user may search for "example.com" in a DNS data source with the "Domain" index selected. The user interface may enable searching of various data sources/indices such as a call data source (e.g., telephone call logs) with indices: call duration, call identifier, phone number, etc.; a DNS data source with indices for domain names and/or IP addresses; an email data source; a geographic data source; a license plate data source with indices for geographic coordinates; and/or other data sources/indices such as those illustrated in FIG. 15. In a geographic context, the user interface may enable searching within a geographic area and/or corresponding to a geographic location. As illustrated, the user interface may dynamically present the search results. Additional information regarding a dynamic search user interface system is described in the '882 application, e.g., see paragraphs [0058]-[0135].

Figure 16:
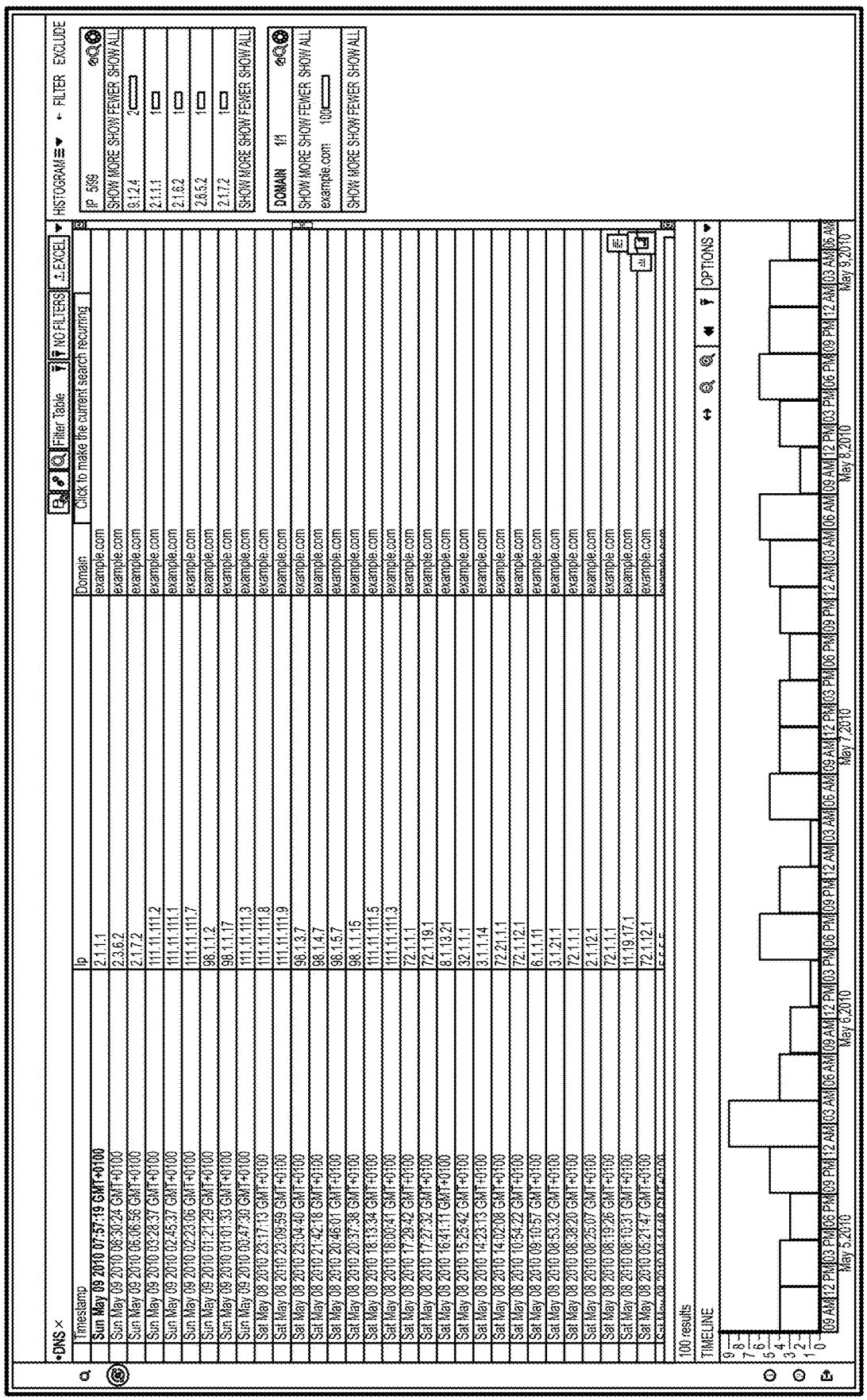

FIG. 16 illustrates another example user interface of the search management system 100. For example, the user interface elements of the user interface of FIG. 16 may be similar to the user interface elements of the user interface of FIG. 15. For example, as illustrated, both user interfaces may enable user to save the current search as a recurring search.

Figure 17:

FIG. 17 illustrates another example user interface of the search management system 100 that enables a user to configure and/or create a recurrent search. In some embodiments, a current search need not return any search results for a recurring search to be configured and/or created by a user. The user interface of FIG. 17 may be similar to the user interface of FIG. 6. A user selection to save a current search, as illustrated by the user selection of the "click to make the current search recurring" user interface option in FIG. 16 that may correspond to the current search illustrated in FIGS. 15 and/or 16, may cause the user interface of FIG. 17 to be presented. The example user interface of FIG. 17 has a name input, a descript input, a start date, an expiration date, and/or a recipient list. The user input received from a user interface along with the search criteria specified from FIGS. 15 and/or 16 may be stored in a search object.

FIG. 18 illustrates another example user interface of the search management system 100 that enables a user to manage their recurrent searches. The user interface of FIG. 18 may be similar to the user interface of FIG. 7. The example user interface of FIG. 18 may enable a user to enable, disable, edit, and/or view one or more recurrent searches.

Implementation Mechanisms

The various computing device(s) discussed herein, such as the search management system 100, search process manager 104, alert manager 108, user interface server 106, and/or user computing device 102, are generally controlled and coordinated by operating system software, such as, but not limited to, iOS, Android, Chrome OS, Windows XP, Windows Vista, Windows 7, Windows 8, Windows Server, Windows CE, Unix, Linux, SunOS, Solaris, Macintosh OS X, VxWorks, or other compatible operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things. The search management system 100 may be hosted and/or executed on one or more computing devices with one or more hardware processors and with any of the previously mentioned operating system software.

Figure 12:
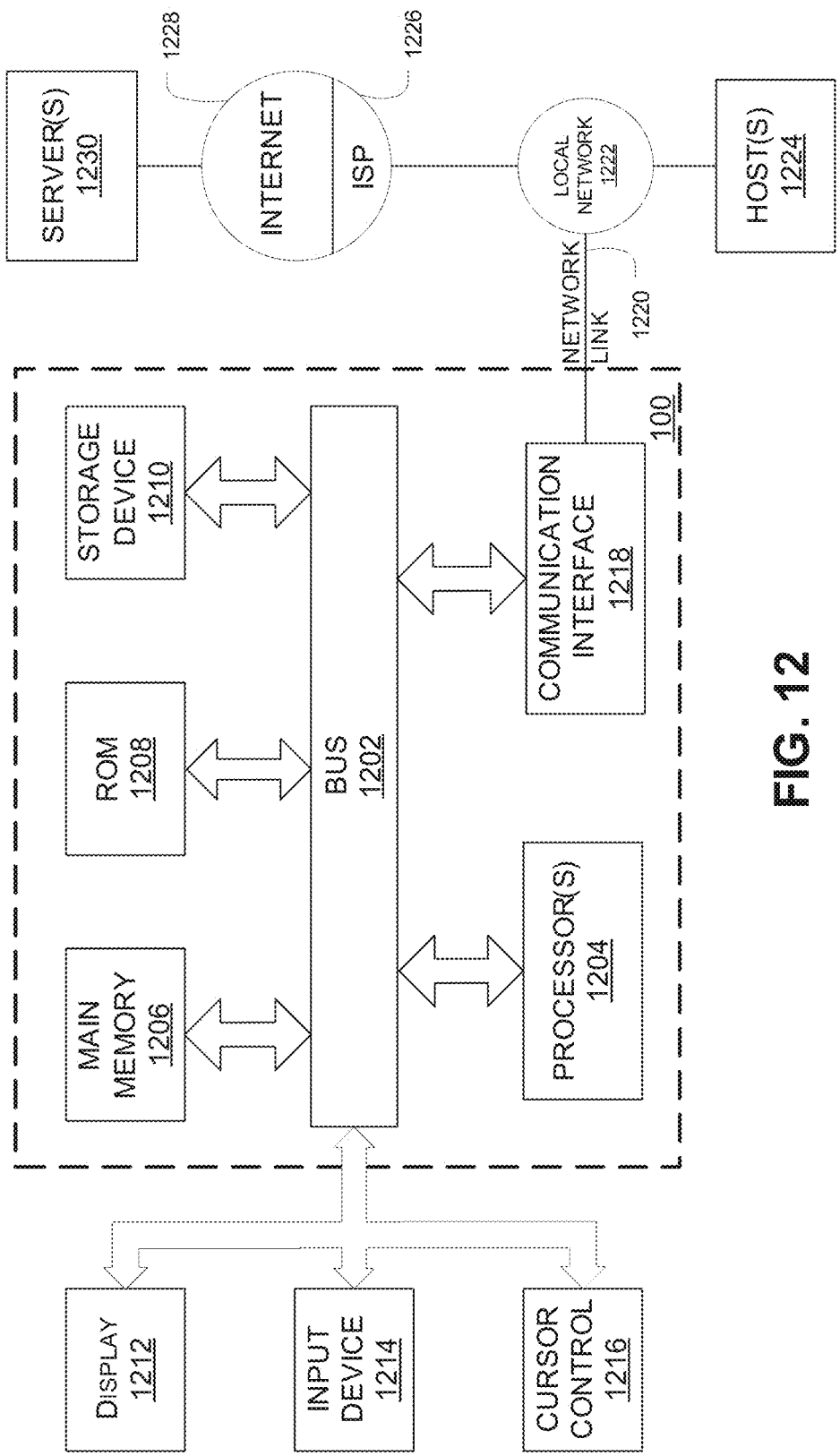
FIG. 12 is a block diagram illustrating an example search management system with which various methods and systems discussed herein may be implemented.

FIG. 12 is a block diagram that illustrates example components of the search management system 100. While FIG. 12 refers to the search management system 100, any of the other computing devices, modules, services, and/or user computing devices discussed herein may have some or all of the same or similar components, such as the search system 120 and/or alert system 130.

The search management system 100 may execute software, e.g., standalone software applications, applications within browsers, network applications, etc., whether by the particular application, the operating system, or otherwise. Any of the systems discussed herein may be performed by the search management system 100 and/or a similar computing system having some or all of the components discussed with reference to FIG. 12.

The search management system 100 includes a bus 1202 or other communication mechanism for communicating information, and a hardware processor, or multiple processors, 1204 coupled with bus 1202 for processing information.

The search management system 100 also includes a main memory 1206, such as a random access memory (RAM), cache and/or other dynamic storage devices, coupled to bus 1202 for storing information and instructions to be executed by processor(s) 1204. Main memory 1206 also may be used for storing temporary variables or other intermediate information during execution of instructions to be executed by processor(s) 1204. Such instructions, when stored in storage media accessible to processor(s) 1204, render the search management system 100 into a special-purpose machine that is customized to perform the operations specified in the instructions. Such instructions, as executed by hardware processors, may implement the methods and systems described herein for scheduling recurrent searches from multiple data sources and/or for providing the search results to one or more users.

The search management system 100 further includes a read only memory (ROM) 1208 or other static storage device coupled to bus 1202 for storing static information and instructions for processor(s) 1204. A storage device 1210, such as a magnetic disk, optical disk, or USB thumb drive (Flash drive), etc., is provided and coupled to bus 1202 for storing information and instructions. The search process manager 104 and/or the alert manager 108 of FIG. 1 may be stored on the main memory 1206 and/or the storage device 1210.

In some embodiments, each of the search storage 116 and/or the data sources 122 of FIG. 1 may correspond to a distributed database management system such as, but not limited to, Apache Cassandra, an Elastisearch system, a file system, relational database such as, but not limited to, MySql, Oracle, Sybase, or DB2, and/or a distributed in memory caching system such as, but not limited to, Memcache, Memcached, or Java Caching System.

The search management system 100 and/or user computing device 102 may be coupled via bus 1202 to a display 1212, such as a cathode ray tube (CRT) or LCD display or touch screen, for displaying information to a computer user. An input device 1214 is coupled to bus 1002 for communicating information and command selections to processor 1204. One type of input device 1214 is a keyboard including alphanumeric and other keys. Another type of input device 1214 is a touch screen. Another type of user input device is cursor control 1216, such as a mouse, a trackball, a touch screen, or cursor direction keys for communicating direction information and command selections to processor 1204 and for controlling cursor movement on display 1212. This input device may have two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The search management system 100 may include a presentation module to implement a GUI, for example, FIGS. 4-7 and/or 9-11, which may be stored in a mass storage device as executable software codes that are executed by the computing device(s). This and other units may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "instructions," as used herein, refers to logic embodied in hardware or firmware, or to a collection of software units, possibly having entry and exit points, written in a programming language, such as, but not limited to, Java, Lua, C, C++, or C #. A software unit may be compiled and linked into an executable program, installed in a dynamic link library, or may be written in an interpreted programming language such as, but not limited to, BASIC, Perl, or Python. It will be appreciated that software units may be callable from other units or from themselves, and/or may be invoked in response to detected events or interrupts. Software units configured for execution on computing devices by their hardware processor(s) may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. Generally, the instructions described herein refer to logical modules that may be combined with other modules or divided into sub-modules despite their physical organization or storage.

The search management system 100, or components of it, such as the search process manager 104, the alert manager 108, user interface server 106 of FIG. 1, may be programmed, via executable code instructions, in a programming language.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1210. Volatile media includes dynamic memory, such as main memory 1206. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1202. Transmission media can also take the form of acoustic or light waves, such as those generated during radio-wave and infra-red data communications.

Various forms of media may be involved in carrying one or more sequences of one or more instructions to processor(s) 1204 for execution. For example, the instructions may initially be carried on a magnetic disk or solid state drive of a remote computer. The remote computer may load the instructions into its dynamic memory and send the instructions over a telephone or cable line using a modem. A modem local to the search management system 100 may receive the data on the telephone or cable line and use an infra-red transmitter to convert the data to an infra-red signal. An infra-red detector can receive the data carried in the infra-red signal and appropriate circuitry can place the data on bus 1202. Bus 1202 carries the data to main memory 1206, from which the processor(s) 1204 retrieves and executes the instructions. The instructions received by main memory 1206 may retrieve and execute the instructions. The instructions received by main memory 1206 may optionally be stored on storage device 1210 either before or after execution by processor(s) 1204.

The search management system 100 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card, cable modem, satellite modem, or a modem to provide a data communication connection to a corresponding type of telephone line. As another example, communication interface 1218 may be a local area network (LAN) card to provide a data communication connection to a compatible LAN (or WAN component to be communicated with a WAN). Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from the search management system 100, are example forms of transmission media.

A network, such as the network 160 of FIG. 1, may comprise, but is not limited to, one or more local area networks, wide area network, wireless local area network, wireless wide area network, the Internet, or any combination thereof.

The search management system 100 can send messages and receive data, including program code, through the network(s), network link 1220 and communication interface 1218. In the Internet example, a server 1230 might transmit a requested code for an application program through Internet 1228, ISP 1226, local network 1222 and communication interface 1218.

The received code may be executed by processor(s) 1204 as it is received, and/or stored in storage device 1210, or other non-volatile storage for later execution.

In some embodiments, the search management system 100 may operate in a distributed computing environment including several computer systems that are interconnected using one or more computer networks. The search management system 100 could also operate within a computing environment having a fewer or greater number of devices than are illustrated in FIG. 1 and/or FIG. 12. Thus, the depiction of search management system 100 in FIG. 1 and/or FIG. 12 should be taken as illustrative and not limiting to the present disclosure. For example, the search management system 100 could implement various Web services components and/or peer-to-peer network configurations to implement at least a portion of the processes described herein. For example, multiple servers and/or processes may schedule queries, query data sources, and/or generate alerts in a distributed manner to expedite the querying of data sources.

It will be appreciated that while the present disclosure typically discusses searching of malware and/or proxy logs, the systems and methods described herein may be agnostic to the types of data being searched and/or may search any type of data source, such as, credit card logs, phone logs, etc., for example.

Each of the processes, methods, and algorithms described in the preceding sections may be embodied in, and fully or partially automated by, code instructions executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

Any process descriptions, elements, or blocks in the flow diagrams described herein and/or depicted in the attached figures should be understood as potentially representing units, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computer-implemented method, comprising:
by a computer system comprising one or more computer hardware processors and one or more storage devices,
receiving user input indicating a recurrent search and an execution condition for the recurrent search, the user input further comprising an indication of a data source, a search term, and a first data attribute type;
querying the data source to determine a first plurality of search results based at least in part on the search term and the first data attribute type, wherein the data source comprises an electronic log comprising network data;
providing the first plurality of search results;
determining to initiate the recurrent search of the data source based at least in part on the execution condition being satisfied;
querying the data source to determine a second plurality of search results based at least in part on the search term and the first data attribute type; and
providing the second plurality of search results.

2. The computer-implemented method of claim 1, further comprising:
storing a search object comprising (i) information regarding the recurrent search, (ii) the indication of the data source, and (iii) the search term,
wherein querying the data source to determine the first plurality of search results further comprises:
accessing the search object.

3. The computer-implemented method of claim 2, wherein the search object further indicates a recipient, and wherein providing the first plurality of search results further comprises:
transmitting the first plurality of search results in an electronic communication to the recipient.

4. The computer-implemented method of claim 2, wherein the search object further comprises a last execution timestamp of the recurrent search, wherein querying the data source to determine the second plurality of search results further comprises:
querying the electronic log for entries with respective timestamps after the last execution timestamp.

5. The computer-implemented method of claim 1, wherein the first data attribute type comprises an Internet Protocol (IP) address type.

6. The computer-implemented method of claim 1, wherein querying the data source to determine the first plurality of search results further comprises:
identifying, from the data source, the first plurality of search results, wherein each search result of the first plurality of search results comprises a data attribute value of the first data attribute type that matches or partially matches the search term.

7. The computer-implemented method of claim 1, wherein determining to initiate the recurrent search of the data source based at least in part on the execution condition being satisfied further comprises:
determining a first query time associated with the first plurality of search results; and
determining that a difference between a current time and the first query time satisfies the execution condition based at least in part on a search frequency.

8. The computer-implemented method of claim 1, wherein receiving the user input comprising the first data attribute type further comprises:
receiving, via a graphical user interface, a user selection of the first data attribute type.

9. The computer-implemented method of claim 8, further comprising:
presenting, in the graphical user interface, a plurality of data attribute types.

10. The computer-implemented method of claim 1, wherein the electronic log comprises a plurality of log entries, wherein each log entry of the plurality of log entries comprises a plurality of data attributes.

11. A system comprising:
a non-transitory computer storage medium configured to store a first plurality of search results; and
one or more computer hardware processors configured to execute code instructions to:
receive user input indicating a recurrent search and an execution condition for the recurrent search, the user input further comprising an indication of a first data source, a search term, and a first data attribute type;
query the first data source to determine a first plurality of search results based at least in part on the search term and the first data attribute type, wherein the first data source comprises an electronic log;
provide the first plurality of search results;
determine to initiate the recurrent search of the first data source based at least in part on the execution condition being satisfied;
query the first data source to determine a second plurality of search results based at least in part on the search term and the first data attribute type; and
provide the second plurality of search results.

12. The system of claim 11, wherein providing the first plurality of search results further comprises:
transmitting the first plurality of search results in an electronic communication to a recipient.

13. The system of claim 11, wherein querying the first data source to determine the second plurality of search results further comprises:
querying the electronic log for entries with respective timestamps after a last execution timestamp of the recurrent search.

14. The system of claim 11, wherein querying the first data source to determine the first plurality of search results further comprises:
identifying, from the first data source, the first plurality of search results, wherein each search result of the first plurality of search results comprises a data attribute value of the first data attribute type that matches or partially matches the search term.

15. The system of claim 11, wherein determining to initiate the recurrent search of the first data source based at least in part on the execution condition being satisfied further comprises:
determining a first query time associated with the first plurality of search results; and
determining that a difference between a current time and the first query time satisfies the execution condition based at least in part on a search frequency.

16. The system of claim 11, wherein receiving the user input comprising the first data attribute type further comprises:

receiving, via a graphical user interface, a user selection of the first data attribute type.

17. The system of claim 16, wherein the one or more computer hardware processors are further configured to execute further code instructions to:
  present, in the graphical user interface, a plurality of data attribute types.

18. The system of claim 11, wherein the one or more computer hardware processors are further configured to execute further code instructions to:
  present, in a graphical user interface, a plurality of data source options, wherein receiving the user input comprising the indication of the first data source further comprises:
    receiving, via the graphical user interface, a user selection of a first data source option from the plurality of data source options, the first data source option corresponding to the first data source.

19. The system of claim 11, wherein the electronic log comprises a first log entry, wherein the first log entry comprises a first plurality of data attributes.

20. The system of claim 19, wherein the first plurality of search results comprises a first search result, wherein the first search result comprises a second plurality of data attributes corresponding to the first plurality of data attributes.

* * * * *